(12) United States Patent
Nister et al.

(10) Patent No.: US 11,981,349 B2
(45) Date of Patent: May 14, 2024

(54) BEHAVIOR PLANNING FOR AUTONOMOUS VEHICLES

(71) Applicant: NVIDIA Corporation, Santa Clara, CA (US)

(72) Inventors: David Nister, Bellevue, WA (US); Yizhou Wang, San Jose, CA (US); Julia Ng, San Jose, CA (US); Rotem Aviv, San Diego, CA (US); Seungho Lee, San Jose, CA (US); Joshua John Bialkowski, San Mateo, CA (US); Hon Leung Lee, Bellevue, WA (US); Hermes Lanker, Zürich (CH); Raul Correal Tezanos, Santa Clara, CA (US); Zhenyi Zhang, San Jose, CA (US); Nikolai Smolyanskiy, Seattle, WA (US); Alexey Kamenev, Carlsbad, CA (US); Ollin Boer Bohan, Redmond, WA (US); Anton Vorontsov, San Jose, CA (US); Miguel Sainz Serra, Palo Alto, CA (US); Birgit Henke, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 248 days.

(21) Appl. No.: 17/178,464

(22) Filed: Feb. 18, 2021

(65) Prior Publication Data
US 2021/0253128 A1    Aug. 19, 2021

Related U.S. Application Data

(60) Provisional application No. 62/978,309, filed on Feb. 19, 2020.

(51) Int. Cl.
*B60W 60/00*     (2020.01)
*B60W 50/00*     (2006.01)
(Continued)

(52) U.S. Cl.
CPC .... *B60W 60/0011* (2020.02); *B60W 50/0097* (2013.01); *G05D 1/0212* (2013.01); *G06N 3/08* (2013.01)

(58) Field of Classification Search
CPC ......... B60W 60/0011; B60W 50/0097; B60W 2556/40; B60W 60/0027; B60W 60/001;
(Continued)

(56) References Cited

U.S. PATENT DOCUMENTS 8,682,574 B2 * 3/2014 Golding ............. G01C 21/3484
                                                         701/425
9,645,577 B1 * 5/2017 Frazzoli ................ B60W 30/00
(Continued)

OTHER PUBLICATIONS

International Preliminary Report on Patentability received for PCT Patent Application No. PCT/US2021/018488, dated Sep. 1, 2022, 8 pages.
(Continued)

*Primary Examiner* — Vivek D Koppikar
*Assistant Examiner* — Dominick Mulder
(74) *Attorney, Agent, or Firm* — Taylor English Duma L.L.P.

(57) ABSTRACT

Embodiments of the present disclosure relate to behavior planning for autonomous vehicles. The technology described herein selects a preferred trajectory for an autonomous vehicle based on an evaluation of multiple hypothetical trajectories by different components within a planning system. The various components provide an optimization score for each trajectory according to the priorities of the component and scores from multiple components may form a final optimization score. This scoring system allows the competing priorities (e.g., comfort, minimal travel time, fuel economy) of different components to be considered together. In examples, the trajectory with the best combined score may be selected for implementation. As such, an iterative
(Continued)

approach that evaluates various factors may be used to identify an optimal or preferred trajectory for an autonomous vehicle when navigating an environment.

20 Claims, 13 Drawing Sheets

(51) Int. Cl.
    *G05D 1/00*          (2006.01)
    *G06N 3/08*          (2023.01)

(58) Field of Classification Search
    CPC ........ G05D 1/0212; G06N 3/08; G06N 3/006;
                              G06N 5/003; G06N 7/005
    USPC .......................................................... 701/25
    See application file for complete search history.

(56) References Cited

U.S. PATENT DOCUMENTS

| | | | |
|---|---|---|---|
| 10,289,469 | B2 | 5/2019 | Fortino et al. |
| 10,761,537 | B1 * | 9/2020 | Ready-Campbell ......................... G05D 1/0212 |
| 10,885,698 | B2 | 1/2021 | Muthler et al. |
| 2016/0321074 | A1 | 11/2016 | Hung et al. |
| 2017/0192437 | A1 * | 7/2017 | Bier ...................... G05D 1/0077 |
| 2018/0089563 | A1 | 3/2018 | Redding et al. |
| 2018/0251126 | A1 | 9/2018 | Linscott et al. |
| 2018/0267537 | A1 * | 9/2018 | Kroop .................... B60W 30/16 |
| 2019/0042859 | A1 * | 2/2019 | Schubert .............. G05D 1/0088 |
| 2019/0107408 | A1 * | 4/2019 | Stroman ............... G05D 1/0005 |
| 2019/0146509 | A1 * | 5/2019 | Dean ..................... G05D 1/0088 701/25 |
| 2019/0250617 | A1 * | 8/2019 | Ford ..................... G05D 1/0212 |
| 2019/0258251 | A1 | 8/2019 | Ditty et al. |
| 2019/0286151 | A1 * | 9/2019 | Palanisamy ...... G08G 1/096816 |
| 2019/0346851 | A1 | 11/2019 | Liu et al. |
| 2020/0132488 | A1 * | 4/2020 | Slutskyy ............ B60W 60/0011 |
| 2020/0142417 | A1 * | 5/2020 | Hudecek ........... B60W 30/0953 |
| 2020/0166940 | A1 * | 5/2020 | Sarkar .................. G05D 1/0223 |
| 2020/0210769 | A1 * | 7/2020 | Hou ........................ G06N 20/20 |
| 2020/0257317 | A1 * | 8/2020 | Musk ..................... G05D 1/0044 |
| 2020/0293049 | A1 * | 9/2020 | De Castro ............ G01C 21/206 |
| 2020/0331499 | A1 * | 10/2020 | Watanabe .......... B60W 60/0025 |
| 2020/0377085 | A1 * | 12/2020 | Floyd-Jones ......... B60W 30/09 |
| 2020/0387156 | A1 * | 12/2020 | Xu ....................... G05B 13/0265 |
| 2021/0048825 | A1 * | 2/2021 | Elvitigala .......... G01C 21/3453 |
| 2021/0114617 | A1 * | 4/2021 | Phillips ............. B60W 30/0956 |
| 2021/0197819 | A1 * | 7/2021 | Okamoto .............. B60W 40/04 |
| 2021/0200212 | A1 * | 7/2021 | Urtasun ............. B60W 60/0011 |
| 2021/0370980 | A1 * | 12/2021 | Ramamoorthy ...... B60W 40/04 |
| 2022/0057803 | A1 * | 2/2022 | Sorin .................... G05D 1/0219 |
| 2022/0080961 | A1 * | 3/2022 | Lienke .................. B60W 30/10 |
| 2022/0170751 | A1 * | 6/2022 | Osanlou ............. G01C 21/3446 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Search Report and Written Opinion received for PCT Patent Application No. PCT/US2021/018488, dated May 3, 2021, 12 pages.

"Programmable Vision Accelerator", U.S. Appl. No. 15/141,703, filed Apr. 28, 2016.

"Reliability Enhancement Systems and Methods" U.S. Appl. No. 15/338,247, filed Oct. 28, 2016.

"Methodology of Using a Single Controller (ECU) For a Fault-Tolerant/Fail-Operational Self-Driving System", U.S. Appl. No. 62/524,283, filed Jun. 23, 2017.

"Systems and Methods for Safe and Reliable Autonomous Vehicles" U.S. Appl. No. 62/584,549, filed Nov. 10, 2017.

"System and Method for Controlling Autonomous Vehicles", U.S. Appl. No. 62/614,466, filed Jan. 7, 2018.

"System and Method for Safe Operation of Autonomous Vehicles", U.S. Appl. No. 62/625,351, filed Feb. 2, 2018.

"Conservative Control for Zone Driving of Autonomous Vehicles Using Safe Time of Arrival", U.S. Appl. No. 62/628,831, filed Feb. 9, 2018.

"System and Method for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for autonomous vehicles" U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Convolutional Neural Networks to Detect Drivable Freespace for Autonomous Vehicles" U.S. Appl. No. 62/643,665, filed Mar. 15, 2018.

"Deep Neural Network for Estimating Depth from Stereo Using Semi-Supervised Learning", U.S. Appl. No. 62/646,148, filed Mar. 21, 2018.

"System and Methods for Advanced AI-Assisted Vehicles", U.S. Appl. No. 62/648,358, filed Mar. 26, 2018.

"System and Method for Training, Testing, Verifying, and Validating Autonomous and Semi-Autonomous Vehicles", U.S. Appl. No. 62/648,399, filed Mar. 27, 2018.

"Method and System of Remote Operation of a Vehicle Using an Immersive Virtual Reality Environment", U.S. Appl. No. 62/648,493, filed Mar. 27, 2018.

"System and Methods for Virtualized Intrusion Detection and Prevent System in Autonomous Vehicles", U.S. Appl. No. 62/682,803, filed Jun. 8, 2018.

"Deep Learning for Path Detection in Autonomous Vehicles", U.S. Appl. No. 62/684,328, filed Jun. 13, 2018.

"Methods for High-Precision, High-Accuracy Lane Detection in Autonomous Driving Applications", U.S. Appl. No. 62/699,669, filed Jul. 17, 2018.

Wikipedia contributors. (Oct. 20, 2020). Markov decision process. In Wikipedia, The Free Encyclopedia. Retrieved from the internet on Nov. 4, 2020: <https://en.wikipedia.org/w/index.php?title=Markov_decision_process&oldid=984488264>.

Planning a Safer Path: Mathematically Verified and Validated in Simulation, NVIDIA Safety Force Field Protects Against Real-World Traffic. NVIDIA.com. Retrieved from the internet on Nov. 4, 2020: <https://www.nvidia.com/en-us/self-driving-cars/safety-force-field/>.

Nister, David, et al. An Introduction to the Safety Force Field. Mar. 2019. NVIDIA. Retrieved from the internet on Nov. 4, 2020: <https://www.nvidia.com/content/dam/en-zz/Solutions/self-driving-cars/safety-force-field/an-introduction-to-the-safety-force-field-updated.pdf>.

(56) References Cited

OTHER PUBLICATIONS

Nister, David, et al. The Safety Force Field. Mar. 2019. NVIDIA. Retrieved from the internet on Nov. 4, 2020: <https://www.nvidia.com/content/dam/en-zz/Solutions/self-driving-cars/safety-force-field/the-safety-force-field.pdf>.

* cited by examiner

BEHAVIOR PLANNING FOR AUTONOMOUS VEHICLES

CROSS-REFERENCE TO RELATED APPLICATIONS

This application claims the benefit of U.S. Provisional Application No. 62/978,309, filed Feb. 19, 2020, which is incorporated herein by reference in its entirety.

BACKGROUND

Designing a system to drive a vehicle autonomously and safely without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along the path of the vehicle. Thus, the ability to detect obstacles, paths, wait conditions, road or lane geometry, and/or other information about the environment is often critical for autonomous driving perception systems.

The determinations of driving perception systems may be used for behavior planning—e.g., determining a trajectory(ies) along a route of the vehicle. As such, behavior planning for autonomous vehicles is a challenging yet critical task, particularly for complex urban scenarios. For example, for an autonomous vehicle to understand its surroundings in order to make safe and effective behavior decisions, the autonomous vehicles must process these various environmental inputs along with the current vehicle trajectory and route information to calculate a continuing or future trajectory for the vehicle. However, conventional systems for behavior planning often rely on inflexible decisions that do not account for the constantly changing variables in the environment. For example, conventional methods may select a route with the lowest travel time and then pick a lane plan that follows the route. However, this rigid planning does not allow a planning system to optimally adjust a trajectory based on changing environmental conditions. For example, by determining behaviors for the vehicle separately from other determinations—such as collision avoidance—adjustments to a current plan may be reactive, rather than proactive. As such, in the example of collision avoidance, a control decision may be determined using the outputs from a behavior planner and, upon determining a collision is possible, a collision avoidance functionality may generate an updated control decision. As a result, the trajectory of the vehicle is not determined using collision avoidance as a factor, but rather is overwritten by the collision avoidance functionality of the vehicle. These conventional systems thus determine behaviors for the vehicle that are sub-optimal, and that do not take into account the dynamic inputs from various different functionalities of the vehicle—such as collision avoidance or lane planning.

SUMMARY

Embodiments of the present disclosure relate to behavior planning for autonomous vehicles. Systems and methods are disclosed related to planning a trajectory for an autonomous vehicle that has several advantages over previous trajectory planning technologies. For example, in contrast to conventional technologies, the technology described herein allows multiple hypothetical trajectories to be concurrently evaluated by different components within a planning system. Each of these various components—e.g., corresponding to collision avoidance, vehicle maneuver types, route planning, lane planning, yield information, etc.—may provide an optimization score for each trajectory according to the priorities of the component. As such, scores from multiple components may form a final optimization score, and the trajectory with the best combined score may be selected for implementation. This scoring system allows the competing priorities (e.g., comfort, minimal travel time, fuel economy, safety, etc.) of different components to be considered together.

In further contrast to conventional systems, such as those described above, the technology described herein allows for safer more efficient planning by providing information that can be used by multiple system components to quantify the consequence of not following a currently preferred or selected lane plan or route. For example, while conventional approaches may recognize that failing to change lanes within the next five seconds could cause a route to be missed, these conventional approaches are not known to quantify or encode this failure when generating potential future trajectory outputs for the vehicle. By quantifying this failure, according to the present disclosure, a preferred or optimal route may be generated and used by the planning system when determining a trajectory to follow. As a result, the behavior planning system of the present disclosure may use information from various system components to determine potential trajectories for the vehicle, and may update the potential trajectories—e.g., in view of each of these various systems—at each iteration or time step to reflect the dynamic nature of environmental variables, route planning information, and/or lane planning information.

BRIEF DESCRIPTION OF THE DRAWINGS

The present systems and methods for behavior planning for autonomous vehicles are described in detail below with reference to the attached drawing figures, wherein.

DETAILED DESCRIPTION

Figure 1:
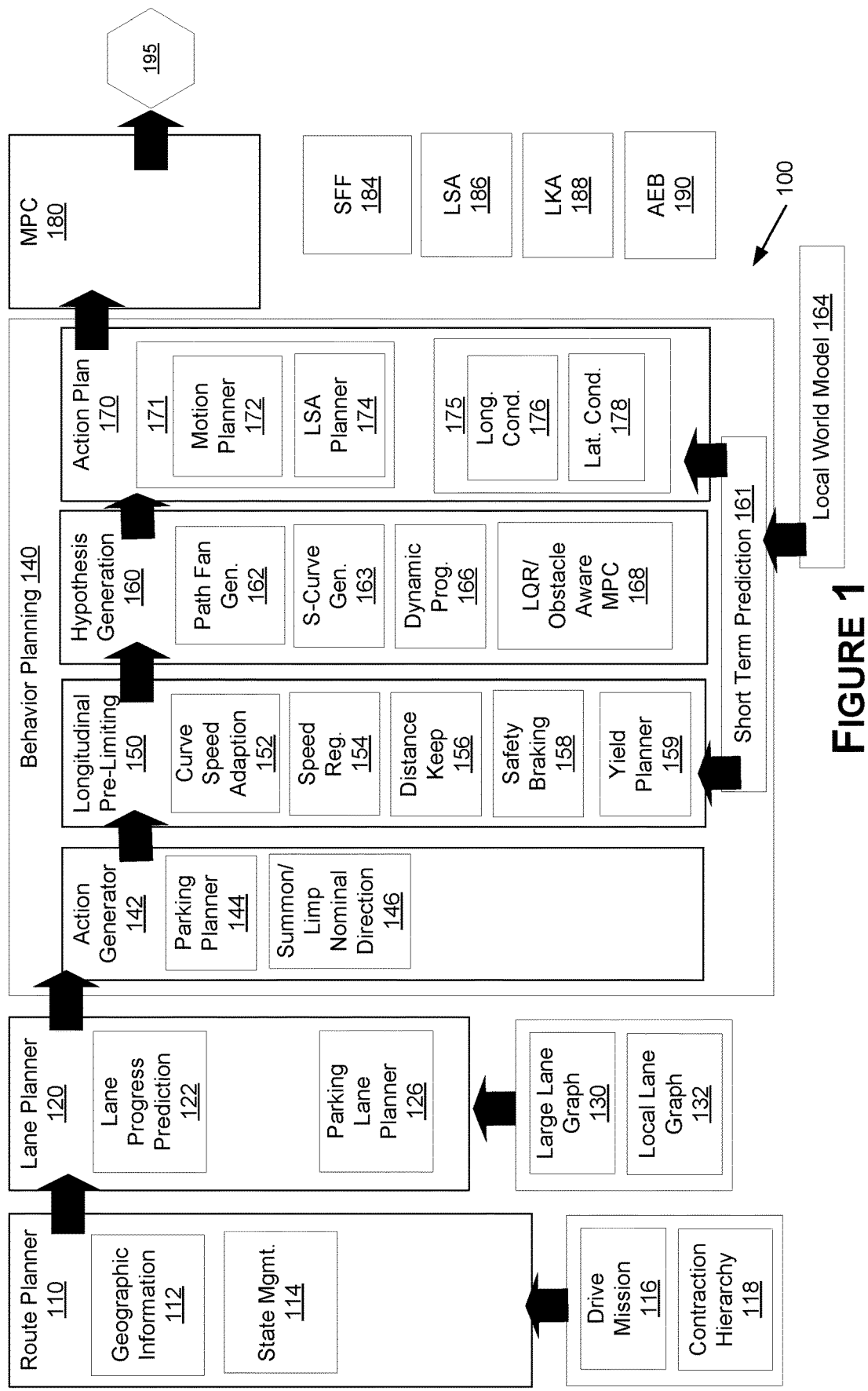
FIG. 1 is an illustration of an example behavior planning architecture for autonomous vehicles, in accordance with some embodiments of the present disclosure.

Systems and methods are disclosed related to planning a trajectory for an autonomous vehicle or another type of autonomous machine, such as but not limited to those described herein. Although the present disclosure may be described with respect to an example autonomous vehicle 800 (alternatively referred to herein as "vehicle 800" or "ego-vehicle 800," an example of which is described herein with respect to FIGS. 8A-8D), this is not intended to be limiting. For example, the systems and methods described herein may be used by non-autonomous vehicles, semi-autonomous vehicles (e.g., in one or more advanced driver assistance systems (ADAS)), robots and robotic platforms, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., behavior planning for robotics), aerial systems (e.g., behavior planning for a drone or other aerial vehicle), boating systems (e.g., behavior planning for watercraft), simulation environments (e.g., for testing or validating behavior planning systems of virtual vehicles within a virtual simulation environment), and/or other technology areas, such as for route planning, lane planning, behavior planning, and/or control decisions.

The technology described herein may employ an architecture that allows each planning component to use minimal computing resources. In some embodiments, the trajectory planning system described herein may utilize three different planning components, each with a different planning horizon. As a result, computational efficiency may be improved by providing each planning component with planning information having just enough detail to accomplish the required task across the respective planning horizon. In at least one embodiment, the three different planning components include a route planner, a lane planner, and a behavior planner. Each component may produce a result and/or result set and communicate it to the next component in the planning pipeline. The route planner may communicate a route set to the lane planner and the lane planner may communicate a lane plan to the behavior planner. The behavior planner may develop and evaluate multiple trajectories. The lane plan may take the form of a lane graph with time rewards associated with graph nodes. This type of lane plan may differ from traditional lane plans that comprise one or more lane sequences. A selected or optimized trajectory may be sent from the behavior planner to a motion controller that is responsible for implementing the planned trajectory.

The route planner may have geographic information covering a large geographic area (e.g., a metro area, a state, a country, a region), but with a relatively low amount of detail (e.g., less detail than is found in geographic information used for lane planning and trajectory planning). The planning horizon for the route planner may be the entire area between a starting point (e.g., current location) and a destination point. The route planner may use low detail maps of a comparatively large area to calculate multiple routes to a destination. For example, the large geographic area may be greater than 50 square miles, greater than 500 square miles, greater than 1000 square miles, or larger. In an aspect, a single route is not initially selected as optimal and, instead, each route may be scored according to an estimated time of travel to the route destination or by some other scoring mechanism that quantifies an optimal or preferred route. Because an almost infinite number of routes might be possible, various methods may be used to identify the top plurality of routes. For example, the five, ten, fifty, and/or another number of the best routes, as measured by estimated time of travel and/or other factors, may be identified. These routes may be communicated to the lane planner and the lane planner, in addition to other components, such as the behavior planner—may determine a preferred route from among the plurality.

The lane planner can generate a lane plan based on the one or more routes received from the route planner. The lane planner may use a second geographic map that includes more detail than found in the map used by the route planner. The second geographic map may cover a smaller geographic area than the map used by the route planner. For example, the smaller geographic area may be less than 50 square miles. In some embodiments, the lane plan can take the form of an annotated lane graph that can have a planning horizon of several miles. A lane graph may generally shows lanes available to the autonomous vehicle on a route (e.g., a road). The annotations on the lane graph can indicate a temporal score for various positions or points on the lane graph. For example, a temporal score may be provided every 10 meters, 20 meters, or some other interval. The temporal scores may communicate the overall value of getting the autonomous vehicle to a particular point on the lane graph.

The behavior planning component can then take these scores into consideration when evaluating various trajectories. For example, in some situations one lane may work as well as any other available lane. As an illustration, an autonomous vehicle traveling down an interstate highway 20 miles away from an exit indicated by a route may use either lane without meaningfully impacting travel time. In this circumstance, the temporal score for each lane may be very similar or even identical. On the other hand, as the autonomous vehicle approaches the exit the temporal scores in the exit lane will increasingly indicate a preference for being in the exit lane over the temporal scores in the non-exit lane. At the exit, the difference between the temporal scores in the exit lane and other lane may correspond to a time penalty incurred by missing the exit. Thus, if missing the exit will cause a five-minute increase in the travel time to the destination then the difference in temporal scores may reflect this five-minute increase.

The behavior planning component can consider these different temporal scores when planning a trajectory. The behavior planner may have a smaller planning horizon than the route planner or the lane planner. In general, the behavior planner may plan a vehicle's movement for the next half second, second, two seconds, three seconds, four seconds, five seconds, ten seconds, twenty seconds, etc., and/or based on a distance measure, such as the next 5 m, 10 m, 50 m, 100 m, 200 m, 300 m, etc. The distance covered will vary depending on the vehicle's speed of travel. The behavior planner may use a map showing a high level of detail over a small area. For example, the small area may be less than the area in a map used by the lane planner or route planner. For example, the map used by the behavior planner may cover less than a hundred square meters. The higher amount of detail can include objects (e.g., other vehicles, pedestrians) detected by sensors associated with the autonomous vehicle. In an aspect, at least some of these objects may not be in information available to the lane planner. The actual trajectory selected may govern the motion of the autonomous vehicle for only a short period of time, such as a second, or a short distance, such as five meters. New trajectories may be constantly evaluated and implemented to adjust for changing conditions (e.g., moving vehicles, moving pedestrians, wait conditions, etc.) in the autonomous vehicle's environment.

The behavior planner may initially select one or more desirable actions for the autonomous vehicle to take. The actions may be based on the annotated lane graph provided by the lane planner. The action or actions selected may be based on achieving a safe, efficient, or best result indicated by the temporal scores included in the annotated lane graph. Possible actions include, but are not limited to, lane follow, lane change speed adapt, overtake, double lane change, and lane change push. The behavior planner may generate a plurality of possible or hypothetical trajectories that achieve the desired action or actions. Various components within the behavior planner may score the hypothetical trajectories and/or possibly eliminate trajectories. For example, if a collision avoidance component determines that a hypothetical trajectory would or could result in a collision, then the hypothetical trajectory may be eliminated from further consideration. In contrast, a comfort module may assign a score to each trajectory based on providing a comfortable ride to a passenger riding in the autonomous vehicle. Other modules or components may similarly generate and assign scores such that the selected or preferred trajectory is selected from a plurality of trajectories having a highest or best score.

As a result, the technology described herein may improve upon current technologies by using an iterative approach to identify an optimal trajectory. In a first iteration, the initial plurality of hypothetical trajectories may be evaluated with the trajectory having the highest optimization score acting as a seed to generate additional hypothetical trajectories for evaluation. In a second iteration, the second plurality of hypothetical trajectories may be generated by marginally changing various parameters of the seed trajectory. The second plurality of hypothetical trajectories may then be evaluated to determine if one of these trajectories has a higher optimization score than the seed trajectory. The hypothetical trajectory with the best optimization score may be selected for implementation.

With reference to FIG. 1, FIG. 1 is an example behavior planning architecture 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The behavior planning architecture 100 may utilize different planning components (e.g., three planning components), each with a different planning horizon. In one embodiment, the different planning components include a route planner 110, a lane planner 120, and a behavior planner 140. Each component may produce a result and/or result set and communicate it to the next component in the planning pipeline. The route planner 110 may communicate a route set to the lane planner 120 and the lane planner 120 may communicate a lane plan to the behavior planner 140. The behavior planner 140 may develop and evaluate multiple trajectories, and a selected or preferred trajectory may be sent from the behavior planner to a motion controller 180 that is responsible for implementing the planned trajectory.

The route planner 110 may use geographic information 112 covering a geographic area (e.g., a town, a metro area, a state, a country, a region, etc.), but with a relatively low amount of detail, in embodiments. The planning horizon for the route planner may be the entire area between a starting point (e.g., current location) and a destination point (e.g., a final location). The technology may use lower detail maps (e.g., a GNSS-based map as compared to a high-definition (HD) map) of a comparatively large area to calculate multiple routes to a destination. The route planner 110 may use low detail maps of a comparatively large area to calculate multiple routes to a destination. For example, the large geographic area may be greater than 50 square miles, greater than 500 square miles, greater than 1000 square miles, or larger. However, this is not intended to be limiting and, in some embodiments, a map of any detail level may be used. In an aspect, a single route is not initially selected as optimal or preferred but, instead, each route of a plurality of routes may be scored according to an estimated time of travel to the route destination or by some other scoring mechanism that quantifies a preferred route. As such, and because an almost infinite number of routes might be possible, various methods may be used to identify some number of potential routes from a plurality of routes. For example, the ten best routes, as measured by estimated time of travel and/or other factors, may be identified. These routes may be communicated to the lane planner 120 thus providing multiple routes to a lane planner 120.

In one or more embodiments, the route planner 110 may be provided or issued a drive mission 116. The drive mission 116 may be expressed as a sequence of one or more waypoints, which may be encoded as GPS points and/or positions in the large lane graph 130 (such as stop exactly at this bus stop for drop-off or pick-up). The drive mission 116 can also end with a parking area (request to park in a particular parking area). According to one or more embodiments, a parking area is a subset of the large lane graph 130 that typically contains loop structures around the parking lot and optionally map knowledge of the parking spaces themselves.

The route planner 110 may be architected as modularly separable from the other planning steps. The architectural design may support long distance routes efficiently. The route planner 110 may hand off the resulting route plan as well as some basic state information to the lane planner 120. The route plan may include one or more GPS traces that have been determined to be potential approximate routes to use to get from the current position to the waypoints or parking areas. The GPS points in the route plan may also have expected time rewards on them (or if preferred, time rewards may be represented as expected time left to destination). Route planning may be derived using a contraction hierarchy 118, which allows shortest routes to be determined within milliseconds of processing, even for routes across a whole continent. The GPS trace of the route plan may give the lane planner 120 an approximate guide, rather than an exact insistence on a particular lane or road. The route planner 110 can provide multiple routes or route variations that fall within a threshold travel time of each other and, in embodiments, each route can be associated with an estimated travel time. In one embodiment, the route segments each are assigned a travel time which gives the lane planner 120 and other components information that can be used to calculate the cost of missing an exit and being forced onto an alternative route. In some embodiments, the travel time can also be calculated by other components, such as the lane planner 120, and the travel time can be calculated using distances and speed limits, but can also be refined with real-time traffic data, construction data, weather data, and/or the like.

The route planner 110 may also include a state management component 114 to handle basic state management. For example, the state management component 114 may confirm that when cold starting, sensors and compute are up and running and that localization finds its place before the autonomous vehicle begins to move (e.g., before the mission control system begins to navigate the autonomous vehicle). Until then, the route planner 110 may be in a START state. After that, if the autonomous vehicle (or its behavior planner 140) is traveling on a known lane graph, the route planner 110 may switch into the DRIVING state. The route planner 110 may also switch into the PARK state when reaching a parking area in the drive mission. There are also special SUMMON and LIMP (caution) states. Limping occurs when something unexpected occurs and the autonomous vehicle is slowed down to a stop or moving along carefully, for example, a LIMP state may be initiated if localization declares the autonomous vehicle is off the map or cannot localize.

The lane planner 120 can generate a lane plan based on the one or more routes received from the route planner. The lane planner 120 may use a second geographic map that includes more detail than found in the map used by the route planner. The second geographic map may cover a smaller geographic area than the map used by the route planner. For example, the smaller geographic area may be less than 50 square miles. The lane plan can take the form of an annotated lane graph, and the annotated lane graph can have a planning horizon of several miles. A lane graph may represent lanes that are available to the autonomous vehicle on a route (e.g., a road). The annotations on the lane graph can indicate a temporal score for various positions on the lane graph. For example, a temporal score may be provided every 10 meters, 20 meters, or some other interval on the lane graph. The temporal scores may be described as sequential time rewards for potential future locations. The larger or better reward may be associated with the faster path toward the route destination or, in other embodiments, a lower score may indicate a better or faster path. The scale of the reward can be a unit of time, such as seconds.

The temporal scores communicate the overall value of getting the autonomous vehicle to a particular point on the lane graph. The behavior planner 140 can then take these scores into consideration when evaluating various trajectories. For example, in some situations one lane may work as well as any other available lane. As an illustration, an autonomous vehicle traveling down an interstate highway 20 miles away from an exit indicated by a route may use either lane without meaningfully impacting travel time. In this circumstance, the temporal score for each lane may be very similar or even identical. On the other hand, as the autonomous vehicle approaches the exit the temporal scores in the exit lane will increasingly indicate a preference for being in the exit lane over the temporal scores in the non-exit lane. At the exit, the difference between the temporal scores in the exit lane and other lane may correspond to a time penalty incurred by missing the exit. Thus, if missing the exit will cause a five-minute increase in the travel time to the destination then the difference in temporal scores may reflect this five-minute increase.

The lane planner 120 may comprise a lane progress predictor 122 and a parking lane planner 126. The lane planner 120 may receive the route plan and basic state information from the route planner 110. The purpose of lane planning may be to provide information about how valuable it is to be in the various lanes near the autonomous vehicle. For example, if the autonomous vehicle is coming up to a location where one lane separates from the others and exits, the lane planner can provide the information about how much more time may be lost if that exit is missed. The output of the lane planner 120 may be represented as expected time rewards encoded on the large lane graph 130 associated with local lane graph 132. This encoding may provide more flexibility than just a straight order or recommendation for which lane to be in, because it allows the behavior planner 140 to weigh the value of being in a particular lane against the difficulty of the maneuver to get there.

The lane planner 120 works with the large lane graph 130, which may correspond to a lightweight representation of lane positions and the expected times to transition between them. The lane planner 120 may use the route plan GPS trace provided by the route planner 110 as a guide to cut out a corridor (such as a few hundred meters wide) of the large lane graph 130 around the suggested route. The lane planner 120 may then target an area centered some distance (such as a few miles) along the suggested route and use it as a temporary proxy destination. The proxy destination may have an expected time reward from the route plan, which can now be propagated back to all the nodes in the large lane graph 130 within the corridor. The lane planner 120 considers lane changes and the probability that they do not immediately succeed or succeed at all. This means that the expected time rewards may require a probabilistic calculation. For example, each node may be associated with a set of actions (such as lane keep, fork, lane change), and the actions probabilistically result in a new lane position (such as a different lane upon successful lane change, and further along the same lane if it fails).

According to some embodiments, this probability can be expressed as a Markov Decision Process (MDP), which is solved for the value of being in any node starting from given fixed values at the proxy destination. The MDP handles things such as estimating the increasing pressure to make a lane change in time as the autonomous vehicle gets closer to a split in the road, or the feasibility of going into a different lane and later get back to a preferred lane.

There are many algorithms for estimating the values of the states (in this case nodes in the large lane graph) in an MDP, for example classic value iteration. To be efficient, a heuristic may be used to remove all cycles in the large lane graph, which reduces value iteration to a single pass of dynamic programming. The heuristic may be used when there is a cycle to remove the edge furthest away from the autonomous vehicle on the cycle. This heuristic avoids removing an edge that is part of the shortest path between the autonomous vehicle and the destination, but part of a cycle. However, breaking cycles may not ignore the probabilistic adjustment contributed by unnecessary cycles on the way to the destination. For example, if the autonomous vehicle misses a lane change and has to go around four clover leaves to try the exact same lane change again, this may result in an unnecessary cycle. Breaking cycles removes this possibility, but this may be an acceptable approximation since it may be undesirable to use unnecessary cycles. The graph may be directed and multiple paths to the same destination may be considered. Also, reflexive edges pointing back to the same node, such as waiting stopped to make a lane change, can also be handled correctly (a node that has no dependencies other than a reflexive edge may be settled).

Initially, Dijkstra's algorithm—and/or another shortest path algorithm type—may run to find the distance and shortest paths to all nodes using any actions. Then the rewards of nodes are settled or edges on cycles are removed iteratively with a single graph traversal. Dijkstra is then run over the large lane graph to find shortest optimistic paths (assuming lane changes succeed where they can). That produces an ordering of nodes in lane planning scope by the optimistic time to get to them. Also, the edges may be ordered, for example by the time to get to the end of the corresponding edges, so the edges may be ordered the same as the nodes they point to.

Backwards edges are used to keep track of, for each node, which nodes it depends on to settle its expected time (all the nodes it points to for its actions and failed actions). Similarly, edges that point to unsettled nodes may be tracked.

All nodes that have zero dependencies may be found and settled. As the nodes are settled, backwards edges may be used to reduce the dependency counts of other nodes. If these updates find new nodes with zero dependencies, the new nodes may be put in queue too. Also all settled nodes and edges pointing to settled nodes may be removed from the node and edge orders calculated previously.

If there are no nodes with zero dependencies, the unsettled edge furthest away may be removed according to the results of Dijkstra's algorithm (and/or another shortest path algorithm type). The dependencies between nodes may then be updated. In some embodiments, one or more nodes may be produced with zero dependencies, which means there is no connection to other nodes. This represents a dead end and the times associated with these nodes may be settled as a time equivalent to mission failure. The process stops when all nodes are settled. The complexity of this algorithm is essentially the complexity of Dijkstra's algorithm plus a single graph traversal.

The lane planner 120 uses the large lane graph 130 derived from map data, which is also linked to the local lane graph 132 of lanes. In one or more embodiments, the lane planner 120 may derive values for the whole large lane graph 130. However, the behavior planner 140 may (only or mainly) use the values for choices close to the autonomous vehicle on the local lane graph 132. The lane progress predictor 122 may generate a lane progress estimate based on live perception, such as lane speed and level of congestion and speed of the closest vehicles in the different lanes. The progress prediction is used to alter the generic expected traversal times. The expected traversal times allow the lane planner to decide that a lane change to a lane that is currently faster is valuable.

The lane planner 120 may change function when the route planner 110 alters the state (e.g., as non-limiting examples, to PARK, SUMMON, or LIMP). For parking, the lane planner 120 may use the parking lane planner 126 to generate a lane plan. The parking lane planner 126 may use the large lane graph cycles of the parking lot to incentivize the behavior planner 140 to explore the parts of the parking lot that are least recently explored. Parking may have any number of phases. Non-limiting examples of phases include park prowling and maneuvering into a parking spot. Park prowling works similarly to driving around the lane graph in an urban area, except that the purpose is to drive around in cycles until a space is found. The lane planner is able to achieve this by setting the values such that a good driving pattern around the loops is achieved. Once line of sight to an empty space is established, the parking maneuvering is initiated by the behavior planner 140.

Similarly, summon may likewise have any number of phases. Once the autonomous vehicle is on a known lane graph, then lane plan to the destination can be executed, like in the normal DRIVING state. But if the autonomous vehicle is not yet on the known lane graph, such as in a parking space that is a bit off the mapped paths, or with no standard way to get on the mapped paths, then the parking lane planner 126 may be used to find a way to one of the closest poses on the lane graph from where the autonomous vehicle starts. If there is no map at all but just an approximate direction to the summoner, then that approximate direction is simply passed on to the behavior planner 140. LIMP mode may work similarly if no or insufficient detailed map information is available.

The behavior planner 140 may consider one or more actions, and proceed through one or more iterations of hypothesis generation and evaluation of a more detailed implementation of those actions. The more detailed implementation may be expressed as a precise motion plan (a pose trajectory over time for a few seconds into the future) and is evaluated by the motion planner 172. The behavior planner 140 comprises an action generator 142, longitudinal pre-limiting component 150, hypothesis generation 160, and an action plan selector 170.

The behavior planner 140 may have a smaller planning horizon than the route planner or the lane planner. In general, the behavior planner 140 may plan a vehicle's movement for the next few seconds. The distance covered will vary depending on the vehicle's speed of travel. For example, the behavior planner may have a planning horizon of 50 m, 100 m, 200 m, 300 m, or the like. The behavior planner 140 may use a map showing a high level of detail over a small area. For example, the small area may be less than the area in a map used by the lane planner 120 or route planner 110. For example, the map used by the behavior planner may cover less than a hundred square meters. The higher amount of detail can include objects (e.g., other vehicles, pedestrians) detected by sensors associated with the autonomous vehicle. In an aspect, at least some of these objects may not be in information available to the lane planner 120. The actual trajectory selected may govern the motion of the autonomous vehicle for only a short period of time, such as a second. New trajectories may be constantly evaluated and implemented to adjust for changing conditions (e.g., moving vehicles, moving pedestrians) in the autonomous vehicle's environment.

The computational flow for each action evaluated by the behavior planner 140 may be initiated by the action generator 142. The action generator 142 may initially select one or more desirable actions for the autonomous vehicle to take. And the actions may be based on the annotated lane graph provided by the lane planner 120. The action or actions selected may be based on achieving the best result indicated by the temporal scores included in the annotated lane graph. Possible actions include, but are not limited to, lane follow, lane change speed adapt, overtake, lane change push, stop shoulder, park prowl, park endgame, summon, and limp. As with the previously discussed components, the action generator 142 may select or score multiple actions. In some embodiments, the actions may be expressed as a nominal rail and/or each action may be associated with multiple nominal rails.

One or more of the actions may be initiated in the first phase by a nominal lateral rail or lane. The world model 164 may provide an explicit listing of all lanes in an exploded format, for example, that includes all forks of the lane the autonomous vehicle is currently in, as well as lanes the autonomous vehicle can consider changing into with one or more consecutive lane changes. Each of the lanes the autonomous vehicle is currently in provides a lane follow action. Each of the lanes the autonomous vehicle can plausibly change into provides a lane change action. Similarly, the autonomous vehicle can consider an overtake action with the intent of going out and coming back into the ego lane while briefly being in another lane, which could even be for oncoming traffic. The autonomous vehicle can also consider stopping on the shoulder, which is a special lane in the world model. The autonomous vehicle can also consider a u-turn. Each of these actions may come with a nominal rail and even lane edges from the world model and are also often connected to lanes in the map that provide information about the path beyond the live perception range.

In the case of parking, the parking prowling state builds on the same action implementations as lane keep via the incentives provided by the parking lane planner 126. While in park prowling, the behavior planner is monitoring for the presence of an open parking space within the line of sight. This may be provided by live perception (e.g., using a neural network that detects parking spaces) or a combination of mapped parking spaces and obstacle perception, or both redundantly. This process may provide a target quadrangle when an open parking space is detected—which may be slightly different from a nominal rail—that may be converted into a motion plan by the parking planner 144. The parking planner 144 may conduct a search for a trajectory of poses between a current pose and the target pose that is free of obstacle interference. In one or more embodiments, a search algorithm from the A*/D* family of algorithms may be used to search for the trajectory of poses. The search algorithm may be used to decide if the space is actually kinematically feasible to get to, and if so, one or more sequences of poses to get there. In one or more embodiments, this search may be conducted with the current obstacle environment (e.g., at a particular point in time). This means that motion effects such as, for example, a bicyclist that is about to zip past the autonomous vehicle between the autonomous vehicle and the space are not yet fully considered. For this reason, the plan from the parking planner 144 is considered as a nominal rail for the rest of the process, which will consider these motion effects to ensure the actions of the autonomous vehicle are safe (note that other actors may of course move fast even when the autonomous vehicle is driving slowly). The parking planner 144 is nevertheless powerful since it may discover such things as three point turns to get into the space, which would otherwise not be found.

Summon component 146 may work in a similar way as the parking planner 144, but in reverse. The parking planner 144 is used to find a motion plan that gets the autonomous vehicle onto a nearby part of the lane graph. Once on the lane graph, the autonomous vehicle proceeds as usual using lane following actions. If there is no map, or if the autonomous vehicle is in LIMP mode, the autonomous vehicle may not have more than a general sense of which compass direction to travel in. In this case, the autonomous vehicle can simply use that compass direction to form a nominal rail to guide the rest of the process. The computational flow for each of the actions then proceeds similarly. At the end of the process followed by the action generator 142, each action may be associated with a nominal rail and/or lane edges and lanes from the map.

The longitudinal pre-limiting component 150 may receive nominal rails corresponding to actions generated by the action generator 142. Each of these nominal rails may be evaluated by the longitudinal pre-limiting component 150. The longitudinal pre-limiting component 150 considers basic longitudinal constraints on a per-lane (or per-nominal rail) basis. Different constraints may be considered by different components. The components of the longitudinal pre-limiting component 150 include curve speed adaptation 152, speed regulation 154, distance keeping 156, safety braking 158, and/or a yield planner 159. The output of the longitudinal pre-limiting component 150 may include an acceleration constraint that limits the speed associated with each of the nominal rails/lanes that came as input. As such, the longitudinal pre-limiting component 150 may augment a lane/rail with an acceleration limit, speed constraint, or a distance constraint.

The curve speed adaptation 152 may be performed by considering the centripetal forces that may occur in the future if following the curvature of the given lane/rail at a certain speed. This currently takes place on the associated map lane but may also take place on the live perception lanes when their curvatures at range become sufficiently accurate for this task. The result of the curve speed adaptation 152 may be an acceleration constraint calculated based on the acceptable range of centripetal forces. The centripetal force constraints can be based on passenger comfort, safety, and/or other factors.

Speed regulation 154 may implement the standard obedience to speed limits when using this lane. Distance keeping 156 and safety braking 158 may perform some longitudinal control duties related to vehicles and other contenders at long distances at high speed. The distance keeping 156 component may generate an acceleration constraint that enforces a distance between another moving object and the autonomous vehicle. The safety braking 158 component may generate similar constraints that ensure the ability to stop the autonomous vehicle via braking to avoid a potential collision that may occur under different modeled conditions. Most of the longitudinal control related to obstacle avoidance may be handled by the motion planner 172. But for long distances relevant for high speeds, the perception granularity of things such as exact lateral position and extent of leading vehicles in a lane may not be fine enough to warrant motion planning laterally around a lead vehicle. At the highest distances and speeds relevant to full speed oncoming traffic or at full speed encountering a stopped vehicle or hazard, the granularity of the decision may be to slow down or not because there appears to be something slow in the autonomous vehicle's present lane. The logic is similar for slow traffic or other situations in the lanes next to the autonomous vehicle's present lane that prompts the autonomous vehicle to slow down. When the distance is high, Obstacle-In-Path-Assignment (OIPA) may be used to act upon obstacles. When obstacles come closer in, fine tuning such as lateral nudging instead of braking may be selected by the motion planner 172. This architecture also allows the use of already tuned longitudinal limiters for high speed highway driving without significant changes.

The yield planner 159 may handle yielding on a per-lane basis (or lane-to-lane basis) in the sense that some yielding does not have to consider exactly where the autonomous vehicle is laterally in a lane to know that yielding is required. This includes the handling of a stop or yield line where others have right-of-way. This presence of such a condition is provided in the world model 164 via wait conditions. The wait conditions come encoded with a section of the ego-path between an entry and exit line, a contender path with a similar contending section, as well as a wait state which can be thought of as a right-of-way status. The world model 164 may also provide path association of contenders by which the behavior and control module of the autonomous vehicle can deduce that other contenders have right of way (or that the autonomous vehicle does). Wait conditions may include a subset of the above, such as a traffic light to meter an on-ramp, which does not have a direct link to a contender path, only a stop line with a wait state associated to it. The architectural separation of concerns achieved with wait conditions is that wait conditions encode the expectation, rule, or convention. It may then the responsibility of the behavior planner 140 to monitor and implement yielding and determine actual kinematic feasibility or any dangers. The yield planner 159 considers the deceleration required to stop at a line with the STOP_AT_ENTRY wait state (such as induced by a red light). The yield planner 149 may also handle TAKE_WAY_TRANSIENT (such as induced by a yellow light), and may calculate what level of deceleration would be required to stop at the line or before some margin of overrun. This allows the yield planner 149 to decide between, for example, a scenario where the light switched to yellow when almost past the line such that a stop may not be necessary from the scenario when it is appropriate to stop.

The yield planner 159 also handles the YIELD_CONTENTION wait state, which may indicate that the autonomous vehicle is expected to yield to the contending path. This case includes pedestrian crossings, stop signs where contenders have right of way, yield signs, oncoming traffic for an unprotected left turn, right hand precedence in Europe, and many more cases.

These cases all have in common a need to consider the contenders on the associated contender path and make sure that the autonomous vehicle does not impede them, and also to make sure that it is clear to them that the autonomous vehicle is yielding. To do that, the yield planner 159 may execute a simplified (and therefore computationally efficient) form of motion planning. In one or more embodiments, the yield planner uses a simplified model where the autonomous vehicle and the contending actor move along their respective lanes and require the full extents of their respective lanes plus some margin for passage. The yield planner 159 may calculate for particular pairs of longitudinal profiles for the autonomous vehicle and the contenders whether claimed sets will intersect if that future is rolled out (more on this below in the section about motion planning). In short, the claimed set is the set of points in front of any actor that is 'claimed' by its stopping distance. It may be better and more conservative to consider claimed set intersection than simply intersection of the physical bodies, because even if there is not a physical intersection, claimed set intersection means that a dangerous situation that may be hard to control is taking place and at minimum will make others angry or question a yielding intent. Acceleration plans that result in a claimed set intersection (or actual physical intersection) may be output as a longitudinal constraint.

In the case where the autonomous vehicle has a yielding obligation, the yield planner 159 may analyze whether a choice for longitudinal progress interferes with any of the plausible choices for the contender. That is, regardless of whether the contender slows down or accelerates, or chooses a left turn path or straight ahead, etc., the autonomous vehicle will stay well clear.

The yield planner 159 may also consider wait conditions in conjunction, also called wait groups. For example, it may have to ensure that traffic crossing from both left and right can be cleared before trying to clear only the first one, because there is no safe intermediate place to wait for crossing traffic from the right. Another such example is a pedestrian crossing after a left turn when performing an unprotected left. In this case the yield planner 159 may have to ensure that it can clear both oncoming traffic and the pedestrian crossing at the same time. This is signaled in the world model by grouping those wait conditions into a wait group.

The yield planner 159 may also handle the distinction between the case YIELD_ENTRY and YIELD_CONTENTION. The former expects the autonomous vehicle to stay at the entry line until the autonomous vehicle is ready to clear through the contention without delay. In the latter case, the autonomous vehicle can inch forward and is only constrained by the actual contention itself, allowing for example to drive forward into the intersection while waiting for oncoming traffic to open up a gap. In this situation, the constraint may exclude all speeds inconsistent with inching forward.

The yield planner 159 may also handle multi-way stops, signaled by the STOPPED_FIRST_HAS_PRECEDENCE wait state. In this case (the canonical example being the United States four-way stop) the right of way is derived from who stopped first facing the intersection. For this, the yield planner 159 relies on a combination of analyzing who stopped first facing the intersection and short-term prediction. After the precedence is determined, the same analysis as for yield, yield from entry or take way applies. If both the autonomous vehicle and a contender are stopped at the intersection, the short-term prediction uses the history to predict the future motion of contenders. In a situation where another contender stopped before the autonomous vehicle, the prediction should become that it will now move (or that some contender will move). While if the autonomous vehicle is stopped first of all contenders, the prediction of all contenders should be that they stay put. This is powerful, because it allows a policy to become nearly as simple as 'if nobody else is going, go, otherwise wait'. Note that it depends on having sufficient amounts of training data for the relevant case in question. This form of short-term prediction may also be used in the motion planning and can help predict whether to yield in unstructured cases as well.

For the wait state NEGOTIATE, the yield planner 159 delegates the responsibilities regarding visible contenders to the motion planner 172. For this state, there may not be a clear expectation of right-of-way for either party but instead expect to negotiate the situation according to what is kinematically feasible, safe, and efficient. The motion planner 172 will do what is kinematically feasible and safe given prediction and avoiding claimed set intersection, but not yield above and beyond that. This will generate a pushy assertive behavior, effectively taking as much way as possible. The yield planner 159 however does consider invisible actors on contender paths. This warrants a brief discussion of visibility.

The world model 164 expresses visibility in three forms: as unknown regions in the radial distance map, as polygonal occlusion boundaries, and as path occupancy unknown. In the full implementation of the perception and mapping system, these may all be consistent, with occluded areas showing up as regions, with their boundaries, and also affecting path occupancy, consistently. The occlusion boundaries may be produced by an end-to-end trained neural network, as is path occupancy. However, this may not be available in some implementations, thus planning may use path occupancy. Alternate embodiments may use occlusion boundaries to generate expanding claimed sets for the motion planner 172. When the yield planner 159 finds a contender path that does not have a TAKE_WAY wait state and with unknown occupancy vertices (or short distance), it assumes a contender with worst-case speeds (the whole interval from lowest to highest) at those vertices, and performs the yield planning with these virtual contenders. This provides the architectural ability to handle all occluded contenders that come on known contender paths.

The contender paths can be known from the map or by live detection, or both. One implementation for this may be based on mapped contender paths, analyzing visibility by projecting vertices from above the path where the contender is expected to be into sensors, and comparing the distances to depth maps. This in principle can cope with occlusion from both static and dynamic occluders.

The combined output from the various components of the longitudinal pre-limiting component 150 may be a plurality of longitudinally limited nominal rails. The rails generated by the action generator 142 may be combined with multiple different acceleration plans to generate a large number of trajectories along the rail. The plurality of longitudinally limited nominal rails include rails that satisfy the various constraints calculated by the longitudinal pre-limiting component 150. The plurality of longitudinally limited nominal rails may be passed to the hypothesis generation component 160 for further refinement.

The motion planning proceeds through hypothesis generation and evaluation (the motion planner 172). The idea is that the motion planner 172 evaluates given trajectories (full planned poses into the future for the autonomous vehicle) for quality very thoroughly, and hypothesis generation 160 provides promising or plausible trajectories since the space of all trajectories is too large to search.

According to embodiments, a high degree of variability can be used for hypothesis generation for a motion planner 172. In some embodiments, a central component is a path fan generator 162 that starts from the longitudinally limited nominal rail and generates laterally varying choices around it, while keeping its curvature. This is tailored to the intent of following a lane while nudging around to go past static and dynamic obstacles. Longitudinal variations within the longitudinal limits may be added to each lateral choice, producing a 2D grid of trajectories for the motion planner. This is used for the standard lane follow case as well as the actions such as (for example and without limitation) park prowl, park end game, summon and limp that build upon it.

Figure 2:
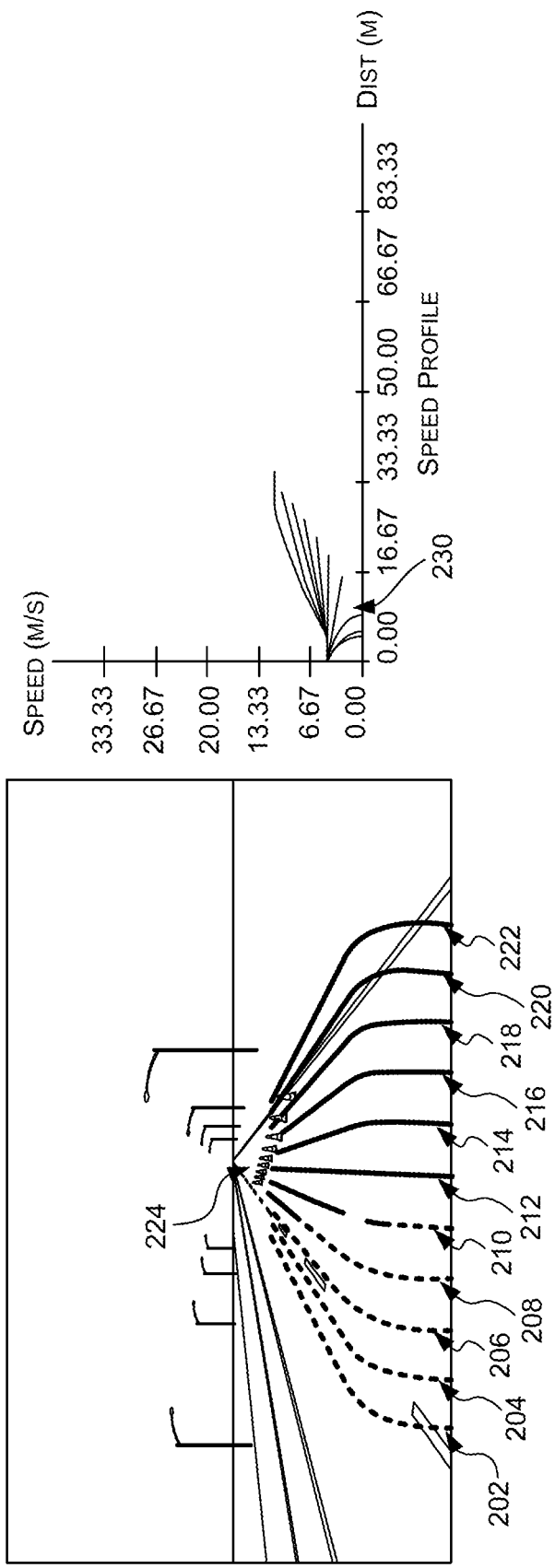
FIG. 2 is an illustration of example rail plans and corresponding speed calculations, in accordance with some embodiments of the present disclosure.

Example trajectories are shown in FIG. 2. The nominal rail can correspond to the right lane in which the autonomous vehicle is located. As can be seen, a series of cones 224 presents an obstacle to be avoided. The path fan generator 162 may generate 11 different laterally varying choices associated with the nominal rail. The varying choices include path 202, path 204, path 206, path 208, path 210, path 212, path 214, path 216, path 218, path 220, and path 222. Each path can be associated with a speed profile as shown on profile graph 230. As can be seen, paths 218, 220, and 222 come to a full stop within a short distance. In contrast, path 202 will allow a higher speed to be maintained.

Lane change may be executed in three stages, expressed as: 1) following a current lane hoping for a gap in the other lane, 2) following a current lane while performing speed adaptation to actively try to fit into a gap, and finally pushing laterally to try to use a gap or try to create one. Note that multiple iterations through hypothesis generation and evaluation may be used, building upon the results of the previous round. For lane change, one iteration of the regular lane follow (path fan generation and motion planner evaluation) may be executed initially. For the first stage of lane change, that is all that may be required. For the speed adaptation stage, the best lateral choice is determined or selected, and built upon. This may be done using the best lateral choice and a small number of additional choices (such as one left and one right of the best choice) to run a search for the best speed adaptation. This may be done by generating a two-dimensional family of longitudinal S-curves, such as by S-curve generator 163, swept by acceleration amount and switching time. The hypotheses then goes through motion planner 172 for evaluation. During the pushing phase, the best result may be used to explore amounts of lateral pushing.

Figure 3:
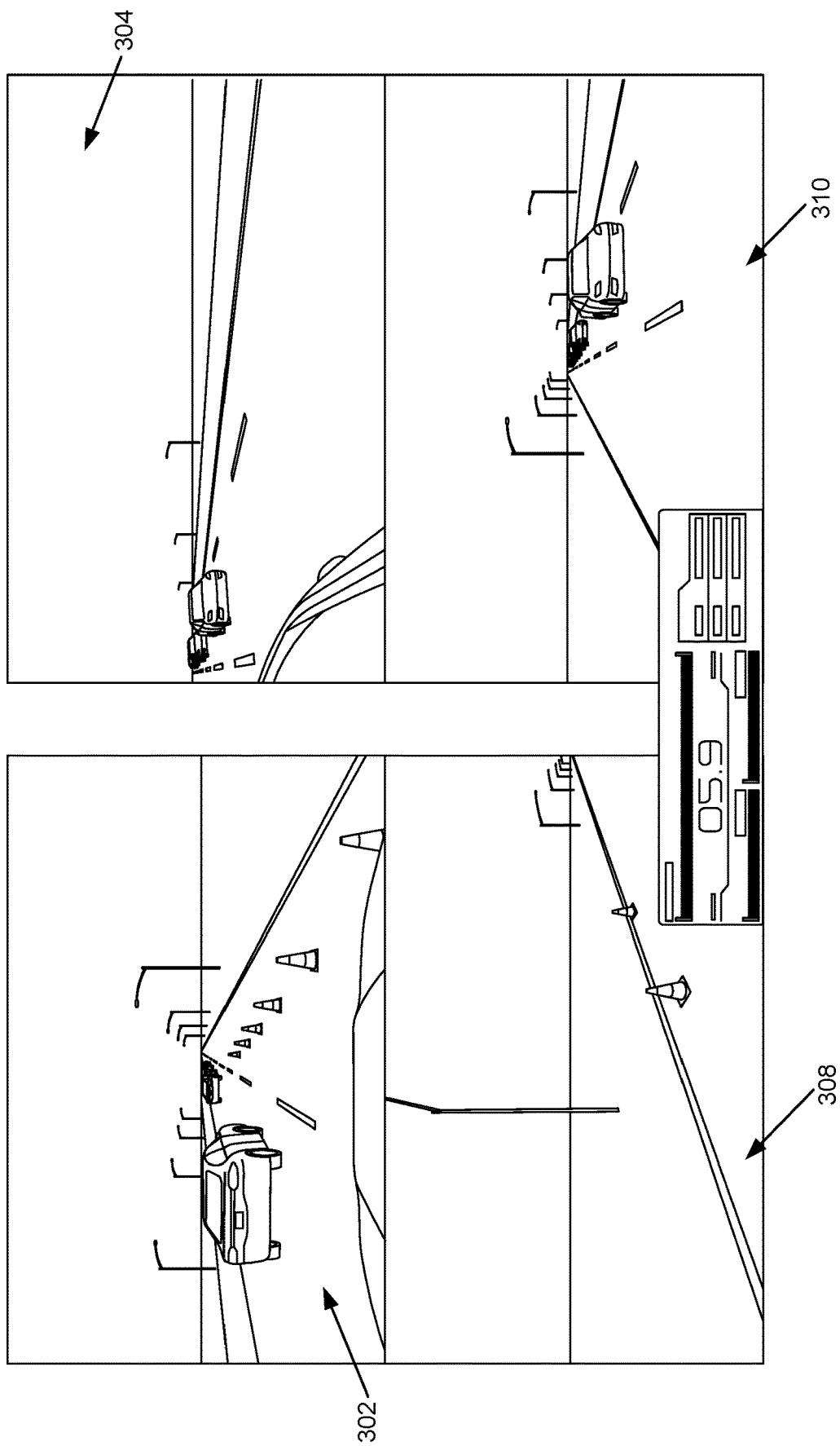
FIG. 3 is an illustration of example environmental conditions around an autonomous vehicle, in accordance with some embodiments of the present disclosure.
Figure 4:
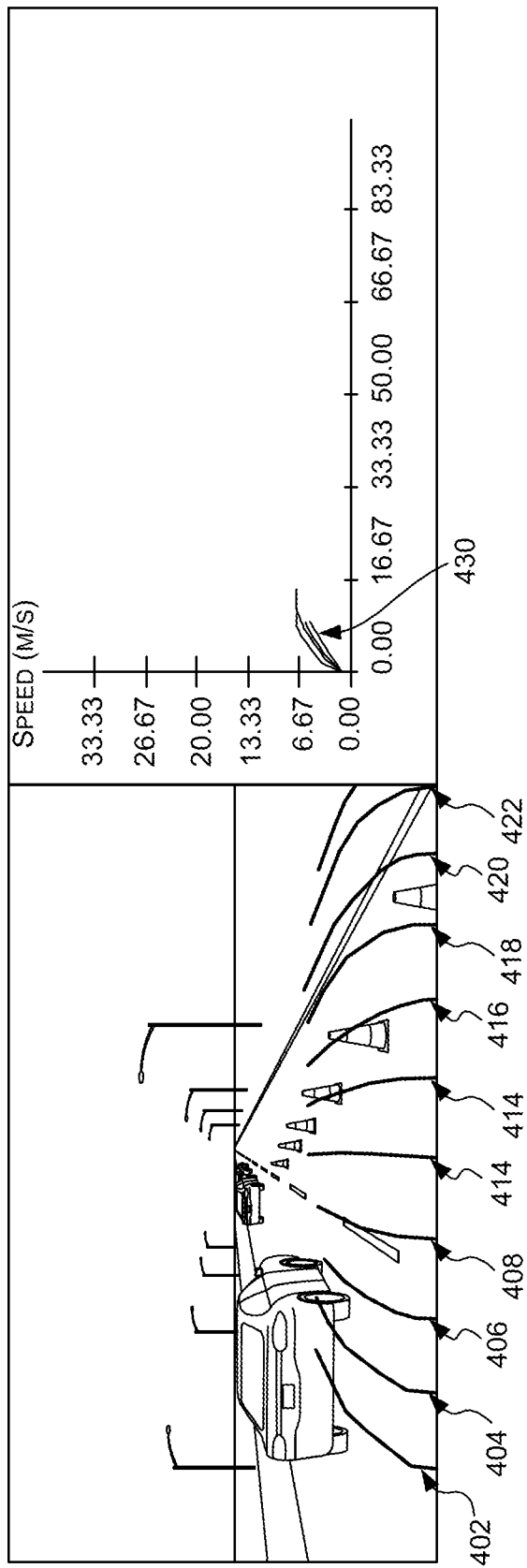
FIG. 4 is an illustration of example rail plans and corresponding speed calculations when adjusted according to environmental conditions, in accordance with some embodiments of the present disclosure.

FIGS. 3 and 4 illustrate hypothesis generation in the context of a lane change constrained by nearby vehicles. FIG. 3, includes a forward view 302 showing a vehicle in the left lane just ahead of the autonomous vehicle. A driver side rear-facing view 304 shows a car in the left lane just behind the autonomous vehicle. A passenger side rear-facing view 308 shows cones the autonomous vehicle has passed. And a rear view 310 also shows the car in the left lane just behind the autonomous vehicle. These views can be used to determine the location of the nearby cars, which in turn can be used to search for hypothetical trajectories consistent with a lane change into the space between the trailing and leading cars in the left lane.

FIG. 4 shows possible paths within the nominal rail generated by the path fan generator 162. These paths includes path 402, path 404, path 406, path 408, path 410, path 412, path 414, path 416, path 418, path 420, and path 422. The speed profile graph 430 shows the speed available for some of the paths.

The hypothesis generation 160 is flexible and can use other less structured approaches such as dynamic programming to search for a free-form path, performed by dynamic programming component 166, or linear-quadratic regulator (LQR)/obstacle aware MPC control 168 that takes an initial path (the nominal rail for example) and iteratively adjusts it to stay away from obstacles. This can either be done on a static scene ignoring motion, trusting that the motion planner will then see and avoid dangerous motion-induced situations, or by using claimed sets directly in the search.

Each hypothetical trajectory can be evaluated by the plan evaluation component 171 to identify the highest quality or optimal trajectory. Here, quality includes many considerations, but can be quantified by an optimization score. Different qualities can be weighed differently when calculating a score. At the high level, ideal driving may be traced back to five categories of terms. Objectives may include, without limitation, maximizing comfort and making progress (get to a destination with minimum expenditure of resources such as time, money, fuel and wear). Another objective may be to maximize collision safety (obstacles), to follow lanes all else being equal (paths), and to operate while following applicable rules and conventions (wait conditions). Some of these preferences are connected to a motion plan in a tangible way. Progress and smoothness can be evaluated directly from the motion plan. For other aspects, it may be hard to make the connection directly. For example, it may be that a good strategy for distance keeping is to stay close to avoid cut-ins from vehicles that have not yet even appeared in proximity, and this is not directly discernible from analyzing obstacles in this scene instance. But direct kinematic constraints from obstacles around the autonomous vehicle can be evaluated with short term prediction. This is discussed further below.

In one aspect, the optimization score is normalized to time. The sequential time rewards for potential future locations can be used directly in the score and as a starting point, while the other components contributing to the score can add time as a penalty. For example, a predicted collision would add 100 hours, which could represent a substantial adjustment or offset (e.g., penalty) and cause this trajectory not to be selected. Lesser, but still undesirable conditions, could result in smaller adjustments. The adjustments can be scaled or normalized according to the route distance or estimated time of travel. In this way, the adjustment resulting from an undesirable feature of a route would add more time on a longer route and less on a shorter route. The normalization could occur by calculating the adjustment as a percentage of the time to destination. For example, some conditions on a route could result in an adjustment of 2% of the estimated time left to reach the destination.

The motion planner 172 also has terms for preferring to stay close to the nominal rail or between the edges of the lane under consideration. These preferences can be used to calculate the optimization score. When lane following, it may be strongly preferred to not extend over the edges of the lane lines even if the lane edge is not a physical obstacle. However, that may be preferable if extending over the edges of the lane lines is the only plausible way to avoid a collision. This is different from making a planned controlled lane change, however. In particular, because in a planned controlled lane change there is time to start the indicator signal and give others time to notice the signal. For that reason, the motion planner 172 considers trajectories within the context of lane follow and lane change differently, even if they could be the same trajectory. The optimization score for a trajectory can increase the more closely the lane center is followed. The optimization score can decrease when a trajectory crosses a lane boundary. The amount of score decrease can depend on the context of the lane crossing. For example, crossing a dashed line may carry a smaller penalty than crossing a solid line or double solid line. Crossing into oncoming traffic could be a very large penalty.

At least some of the wait conditions may be handled by the yield planner 159, although the motion planner 172 can also include some terms informed by yielding requirements to other actors. The motion planner 172 may also include terms that prefer to not share a lane side-by-side, or to avoid being side-by-side even with contenders in other lanes. This helps behaviors such as accommodating lane splitting motorcycles or side-by-side lane sharing when pushing through a highly contested slow speed merge, while not initiating those conditions. Similarly, to allow passing a parked vehicle or being in someone's blind spot, but preferring to have those conditions be transient if possible.

The core of the motion planning may include analyzing a motion plan against obstacle contenders. The analysis may include watching out for intersections between claimed sets. Instead of considering whether there is a collision between physical bodies, now or in the future, motion planning according to disclosed embodiments consider if there is an intersection between claimed sets. This is a way to handle how to upgrade static motion planning to an environment with moving contenders at speeds that do not allow near instantaneous stopping. The claimed set is the shape in space-time that an actor will trace through while trying to stop safely and laterally line up with the road. An actor virtually 'claims' this set since it needs it to maintain collision safety. The idea is that even if bodies do not intersect, intersections of claimed sets would be hard to allow while maintaining some form of controlled safety. Conversely, if claimed sets are mutually respected, actors can stay within them. If they do, the claimed sets play out in space time and do not expand. This allows upgrading the static motion planning problem to one with motion. The claimed sets can stop instantly although the moving actors cannot. Another benefit of this approach is that it does not rely on training data or prediction in near or actual collision situations which is rare or hard to come by. It also ensures collision safety beyond simply getting away without a physical collision.

In one or more embodiments, the Safety Force Field 184 approach may be in operation within the behavior planner 140 and control system of the autonomous vehicle, and is not suspended by any other function. It reactively blocks disallowed instantaneous control and alters it into allowed control. But the design is not to have it trigger in normal operation. The motion planner 172 handles similar underlying constraints in a more proactive way. It essentially asks the question 'if I move in this way into the future, and the contenders move as predicted conditioned on that, will the constraints get triggered?' Then motion plans that are unlikely to trigger constraints in the future can be preferred, or ones that trigger them later in the future can be preferred. Thus, the autonomous vehicle can start slowing down or laterally adjust much sooner and therefore drive smoother and safer. Note that the underlying constraints allow an ego-vehicle thus operating to be quite assertive. As long as predictions suggest the autonomous vehicle will not get into a dangerous situation, and no pre-limiting by the yield planner 159 occurs, the motion planner 172 can generate an assertive behavior.

According to embodiments, the motion planner 172 may use a CUDA implementation to evaluate many future claimed set intersections. CUDA is a parallel computing platform and application programming interface model created by NVIDIA Corporation. It allows software developers and software engineers to use a CUDA-enabled graphics processing unit for general purpose processing. This CUDA implementation considers many choices for the trajectory in parallel, typically a two-dimensional family of trajectories (such as a 10×10 grid) of trajectories that vary both over lateral path and by longitudinal speed. The motion planner 172 then checks, for each of those future trajectories and for each time step, if the predicted actor states lead to claimed set intersections relative to the autonomous vehicle. This is made efficient by a slightly more conservative constraint than the space-time claimed sets intersection. Instead, the other actor should be longitudinally clear along the path of the autonomous vehicle (this is like a quick check that claimed sets do not intersect when viewed 'from the side' looking only at a projection that keeps the longitudinal direction and the time direction) or that claimed sets are separated when viewed from 'top view' projecting away the time direction. An approximation of the claimed sets of all actors when projecting away time is used (2D claimed sets). Collision checks are then performed on a polygonal representation of those 2D claimed sets. Note that static obstacles can be used directly as 2D claimed sets. The above described process means collision checks are performed between polygonal representations for many scene configurations in parallel. The longitudinal pre-limiting is available to the motion planner 172 on a per-action basis, and that can be used both before the motion planner 172 evaluation to change the hypothesis generation and after the evaluation to essentially block or greatly prefer to avoid the faster trajectories.

The Last Safe Arrival (LSA) planner 174 works with the motion planner 172. The LSA planner 174 constraint arises from a more conservative assumption than the SFF 184, which can be applied to pedestrians of which there is no reason to believe are vigilant or of which there is reason to believe may behave erratically. It is derived by assuming that the contender (pedestrian) can accelerate in any direction and will not start slowing down until the autonomous vehicle is literally occupying their path. This leads to a constraint similar to the claimed set intersection from SFF 184, which is applied both instantaneously and as a constraint for a planner (the LSA planner 174) that predicts into the future above the core constraint. If the same prediction as the core constraint is used, which is quite conservative, but a safe starting point for pedestrians, then this amounts to checking that none of current or future claimed sets claim a point after the LSA time that the autonomous vehicle has not already claimed. This can be done efficiently by checking the most distant tip of each of the claimed sets, plus each of the arrivals up to the current stopping distance. This runs in parallel to the motion planner evaluation for the same trajectory set and may apply only to pedestrians.

Short term prediction component 161 can use both an analytical approach and a data-driven approach to generate a predicted location for an obstacle. The analytical approach takes the obstacle fences given by the world model 164 and predicts that they will continue along the velocity vector given with some gradual adjustment back to the lane structure (note that there can be multiple lane choices per contender, such as turning left, right, U-turn, or going straight). The strength of analytical prediction is that low, but non-zero probability, can be encoded and associated with things that are known to be relevant but that could be rare in training data, such as cut-ins or extremely hard braking.

The data-driven approach uses the history of the perceived scene to predict what contenders will do, trained from episodes where the future is known as training data. Real data may be particularly useful for this form of training. According to embodiments, this type of training can be done with the outputs of the automatic system and can therefore benefit from large amounts of data without manually produced ground truth.

The plan selector 175 selects the plan based on the ratings or scoring provided by the plan evaluation component 171. In one instance, the trajectory with the highest quality score is selected. The plan selector 175 may also provide longitudinal conditioning 176 and lateral conditioning 178. Both of these provide minor smoothing to a selected trajectory.

The selected plan may be evaluated by the SFF 184, LSA 186, Lane Keeping Assistant (LKA) 188, and (Automatic Emergency Braking) AEB 190. The motion planner 172 or other components may have considered input from these components when evaluating trajectories or, at least, compliance with constraints these components impose. For example, the safety braking component 158 may generate constraints intended to avoid automatic emergency braking.

The technology described herein may improve upon current technologies by using an iterative approach to identify an optimal trajectory. In a first iteration, the initial plurality of hypothetical trajectories may be evaluated with the trajectory having the highest optimization score acting as a seed to generate additional hypothetical trajectories for evaluation. In a second iteration, the second plurality of hypothetical trajectories may be generated by marginally changing various parameters of the seed trajectory. For example, the seed trajectory could be communicated to the path fan generator 162 and used as input instead of a nominal rail. The path fan generator could then generate a second plurality of trajectories that are small lateral variations (smaller lateral bumps than the ones used in the first iteration on the nominal rail) and small longitudinal variations. The second plurality of hypothetical trajectories may then be evaluated to determine if one of these trajectories has a higher optimization score than the seed trajectory. The hypothetical trajectory with the best optimization score may be selected for implementation.

The Model Predictive Controller (MPC) 180 takes the chosen trajectory and uses a more refined vehicle model to select instantaneous lateral and longitudinal acceleration control 195. MPC control may work by calculating the trajectory into the future based on a control sequence and the model, and iteratively adjusting the control sequence with a non-linear optimizer to optimize a cost function. In this case the cost function may be designed to find a trade-off between smoothness and following the trajectory requested (although since this stage is not obstacle aware, it may be set to follow the trajectory faithfully and smoothness of the trajectory should be ensured by the motion planning stage). The SFF 184 and other components may also be used to gate unacceptable acceleration choices.

Figure 5:
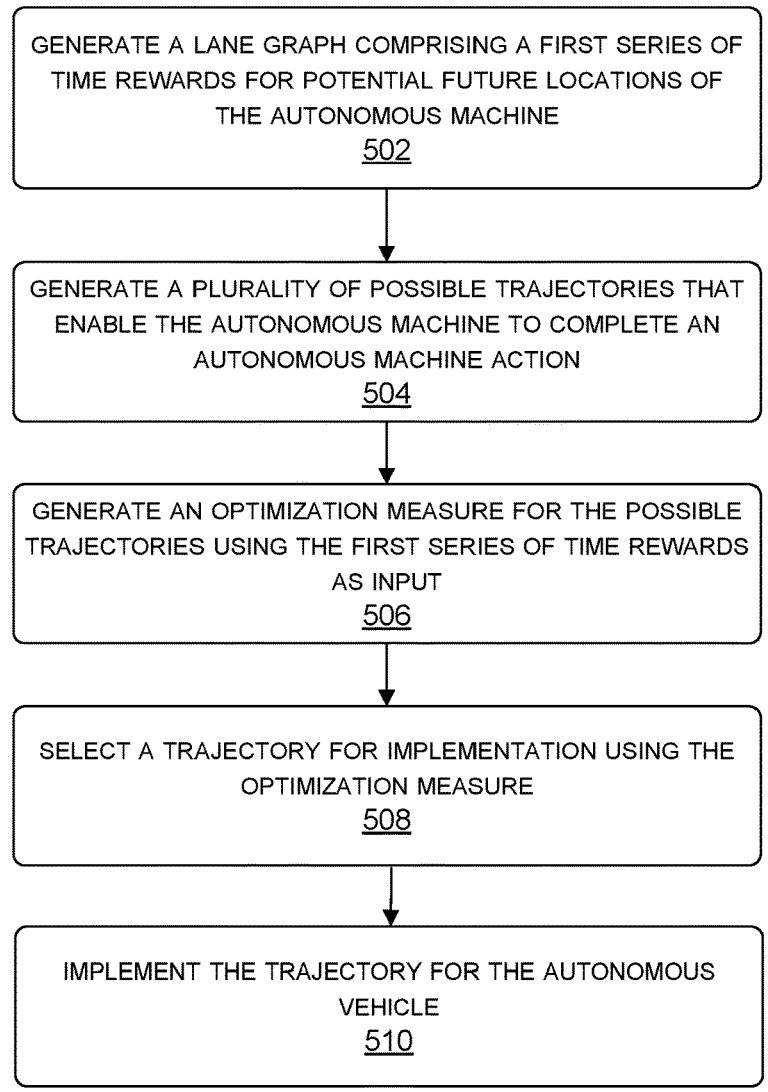
FIG. 5 is a flow chart showing a method of selecting a trajectory for an autonomous vehicle, in accordance with some embodiments of the present disclosure.
Figure 6:
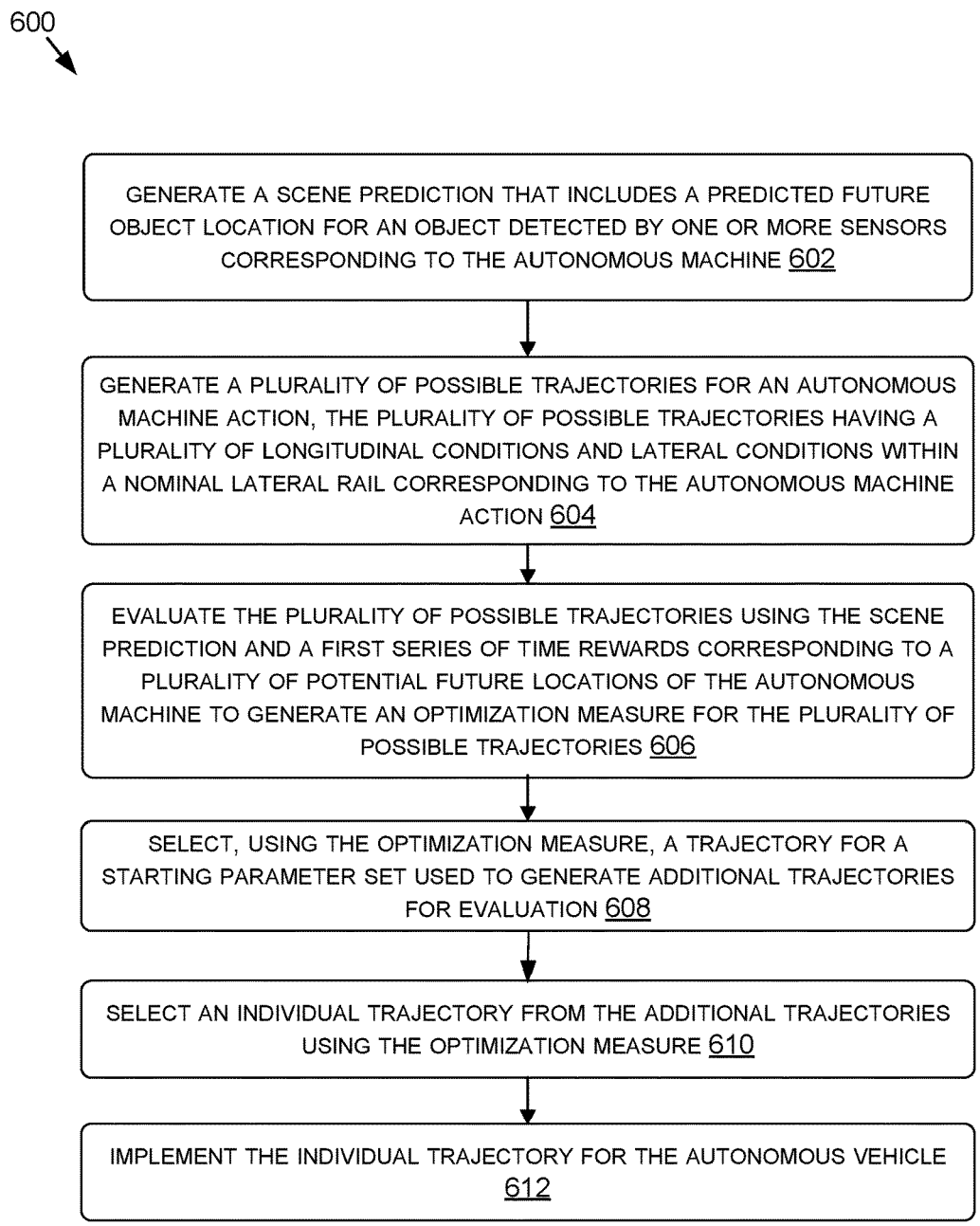
FIG. 6 is a flow chart showing a method of selecting a trajectory for an autonomous vehicle, in accordance with some embodiments of the present disclosure.
Figure 7:
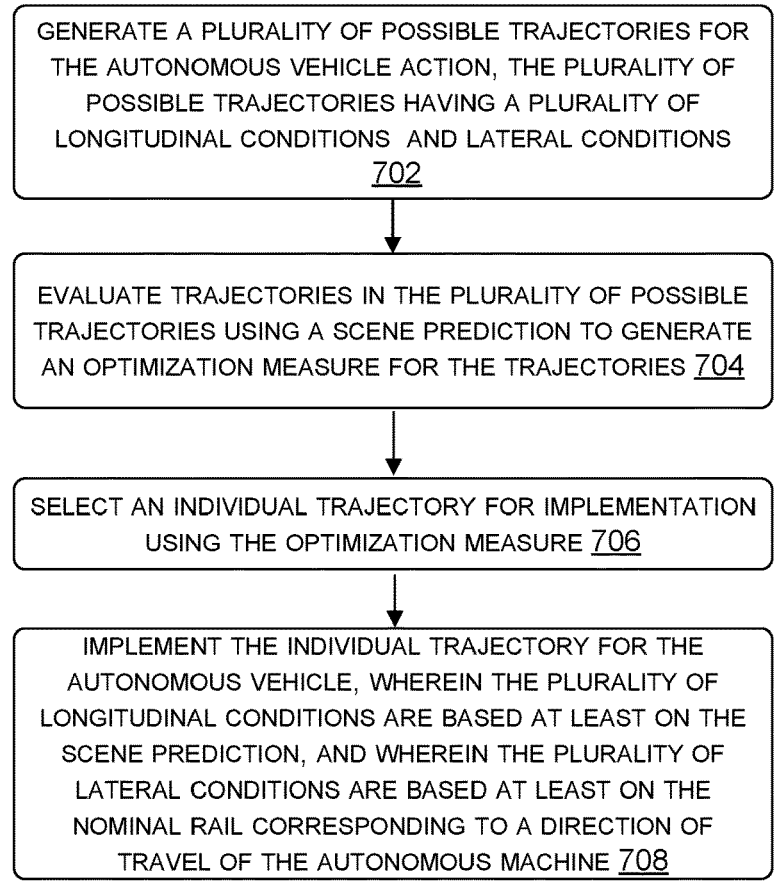
FIG. 7 is a flow chart showing a method of selecting a trajectory for an autonomous vehicle, in accordance with some embodiments of the present disclosure.

Now referring to FIGS. 5-7, each block of methods 500, 600, and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 500, 600, and 700 are described, by way of example, with respect to the behavior planning system 100 of FIG. 1. However, these methods may additionally or alternatively be executed by any one system, or any combination of systems, including, but not limited to, those described herein.

FIG. 5 is a flow diagram showing a method 500 for selecting a trajectory for an autonomous vehicle, in accordance with some embodiments of the present disclosure. The method 500, at block 502, includes generating a lane graph comprising a first series of time rewards for potential future locations of the autonomous machine. The method 500, at block 504, includes generating a plurality of possible trajectories that enable the autonomous machine to complete an autonomous machine action. The method 500, at block 506, includes generating an optimization measure for the possible trajectories using the first series of time rewards as input. The method 500, at block 508, includes selecting a trajectory for implementation using the optimization measure. The method 500, at block 510, includes implementing the trajectory using the autonomous machine.

Now referring to FIG. 6, FIG. 6 is a flow diagram showing a method 600 for selecting a trajectory for an autonomous vehicle, in accordance with some embodiments of the present disclosure. The method 600, at block 602, includes generating a scene prediction that includes a predicted future object location for an object detected by one or more sensors corresponding to the autonomous machine;

The method 600, at block 602, includes generating a plurality of possible trajectories for an autonomous machine action, the plurality of possible trajectories having a plurality of longitudinal conditions and lateral conditions within a nominal lateral rail corresponding to the autonomous machine action. The method 600, at block 604, includes evaluating the plurality of possible trajectories using the scene prediction and a first series of time rewards corresponding to a plurality of potential future locations of the autonomous machine to generate an optimization measure for the plurality of possible trajectories. The method 600, at block 606, includes selecting, using the optimization measure, a trajectory for a starting parameter set used to generate additional trajectories for evaluation. The method 600, at block 608, includes selecting an individual trajectory from the additional trajectories using the optimization measure. The method 600, at block 610, includes implementing the individual trajectory for the autonomous machine.

With reference to FIG. 7, FIG. 7 is a flow diagram showing a method 700 for selecting a trajectory for an autonomous vehicle, in accordance with some embodiments of the present disclosure. The method 700, at block 702, includes generating a plurality of possible trajectories for an autonomous machine action, the plurality of possible trajectories having a plurality of longitudinal conditions and a plurality of lateral conditions. The method 700, at block 704, includes evaluating trajectories in the plurality of possible trajectories using a scene prediction to generate an optimization measure for the trajectories. The method 700, at block 706, includes selecting an individual trajectory from the plurality of possible trajectories using the optimization measure. The method 700, at block 702, includes implementing the individual trajectory for an autonomous machine, wherein the plurality of longitudinal conditions are based at least on the scene prediction, and wherein the plurality of lateral conditions are based at least on a nominal rail corresponding to a direction of travel of the autonomous machine.

Example Autonomous Vehicle

Figure 8A:
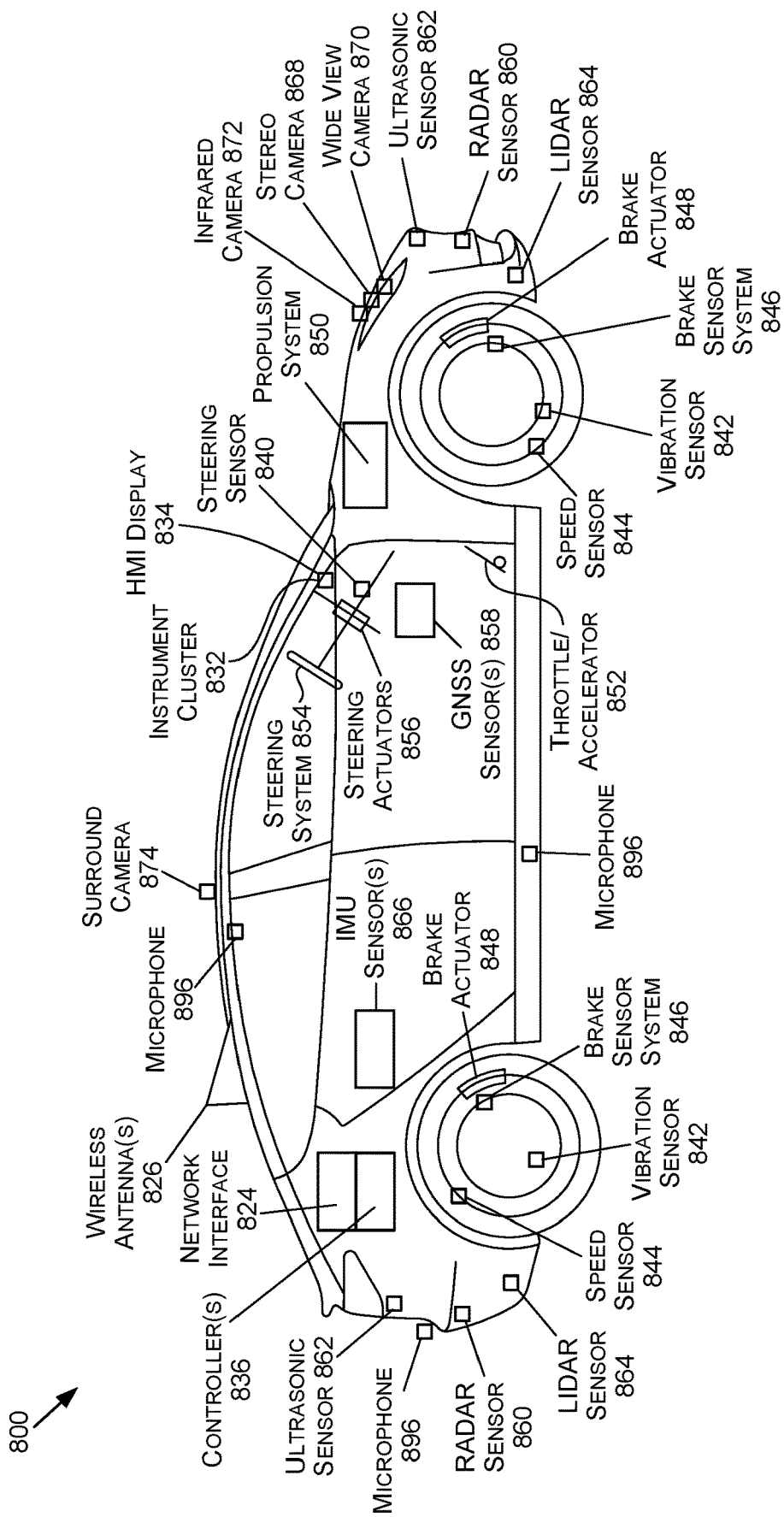
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
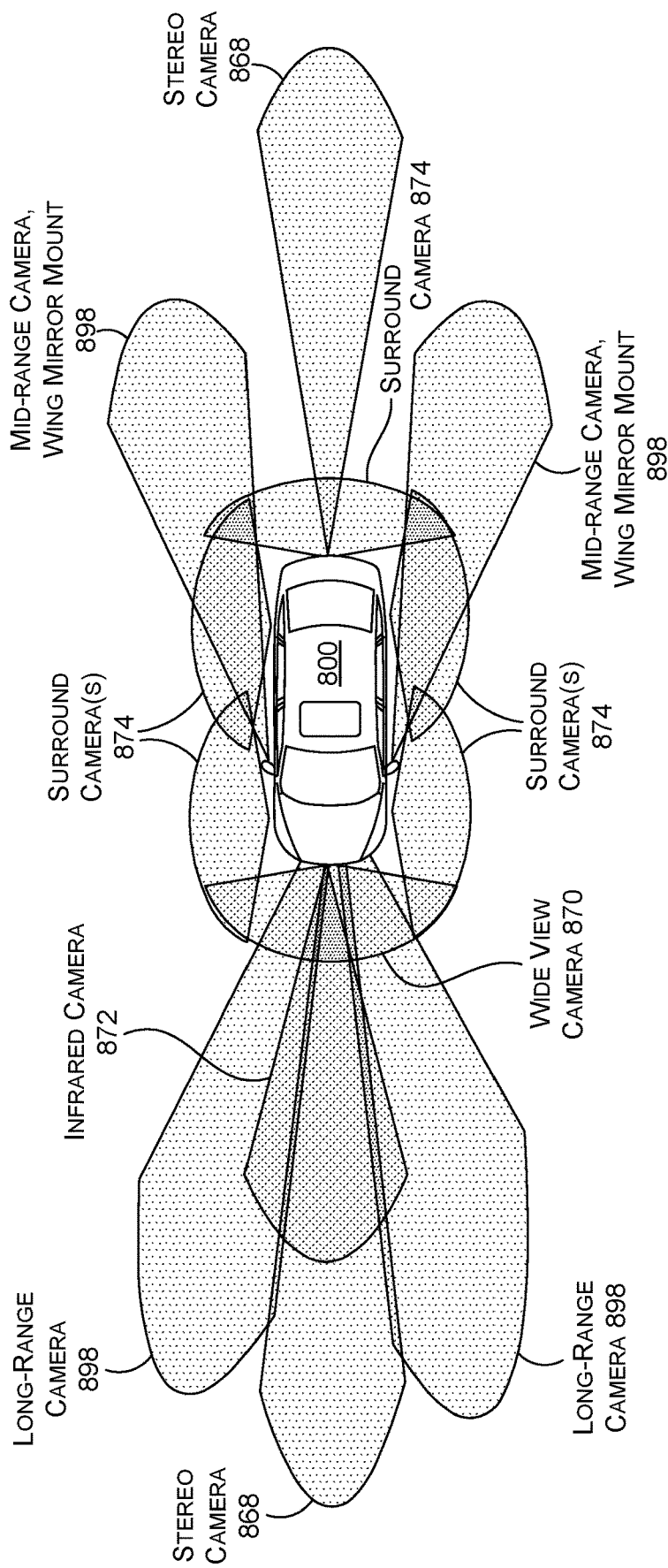
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
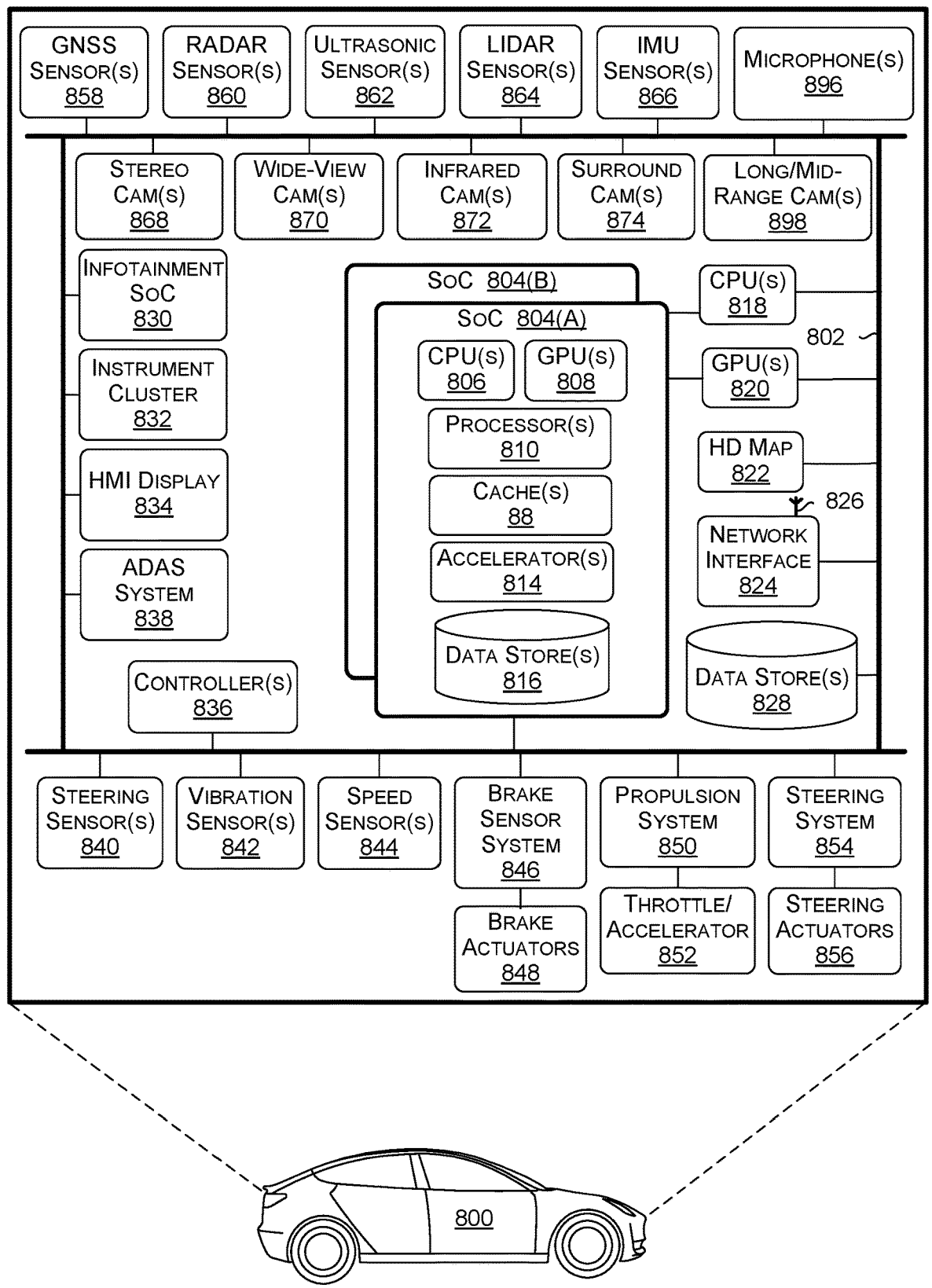
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA Corporation's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA Corporation's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
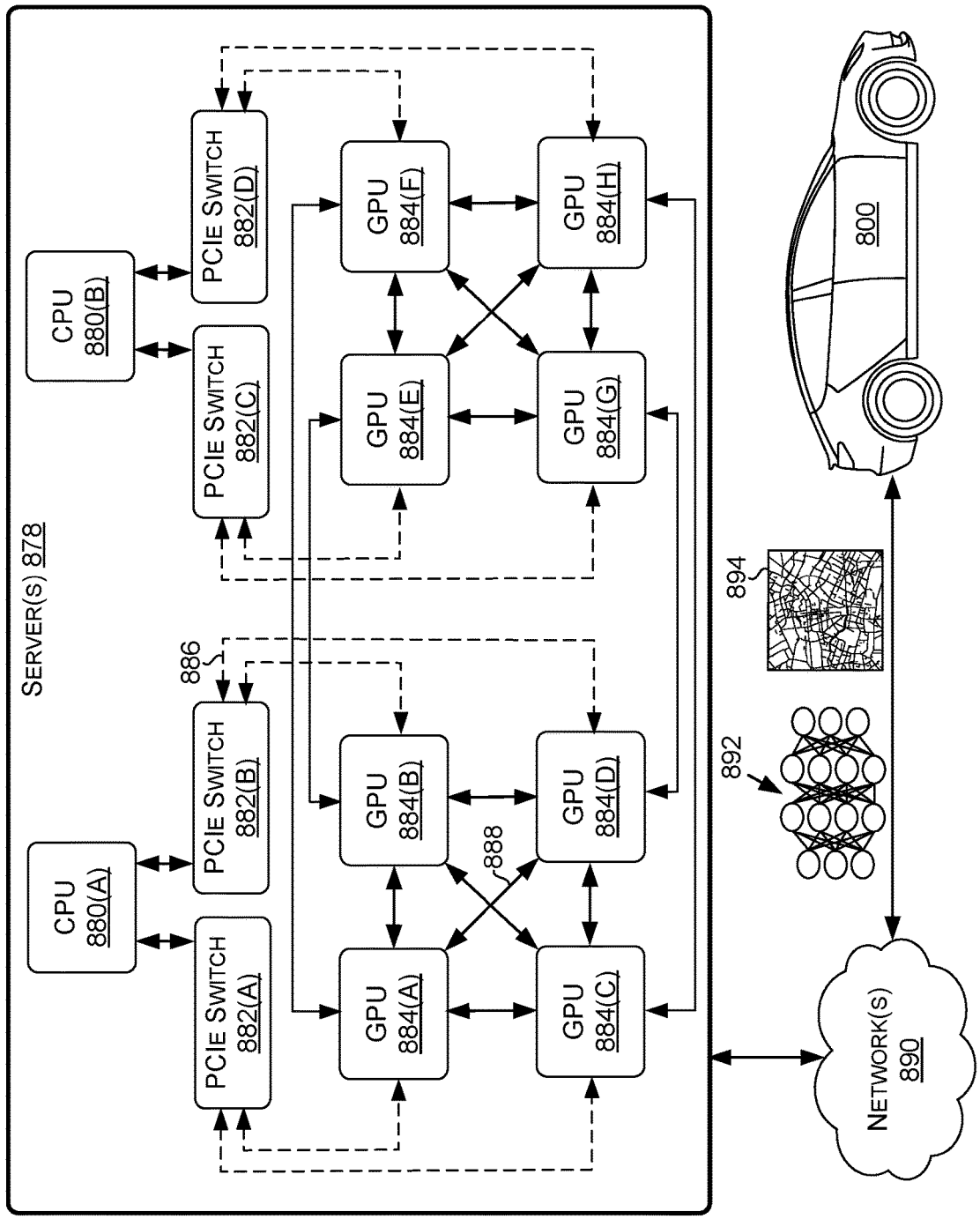
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA Corporation and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA Corporation. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA Corporation's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
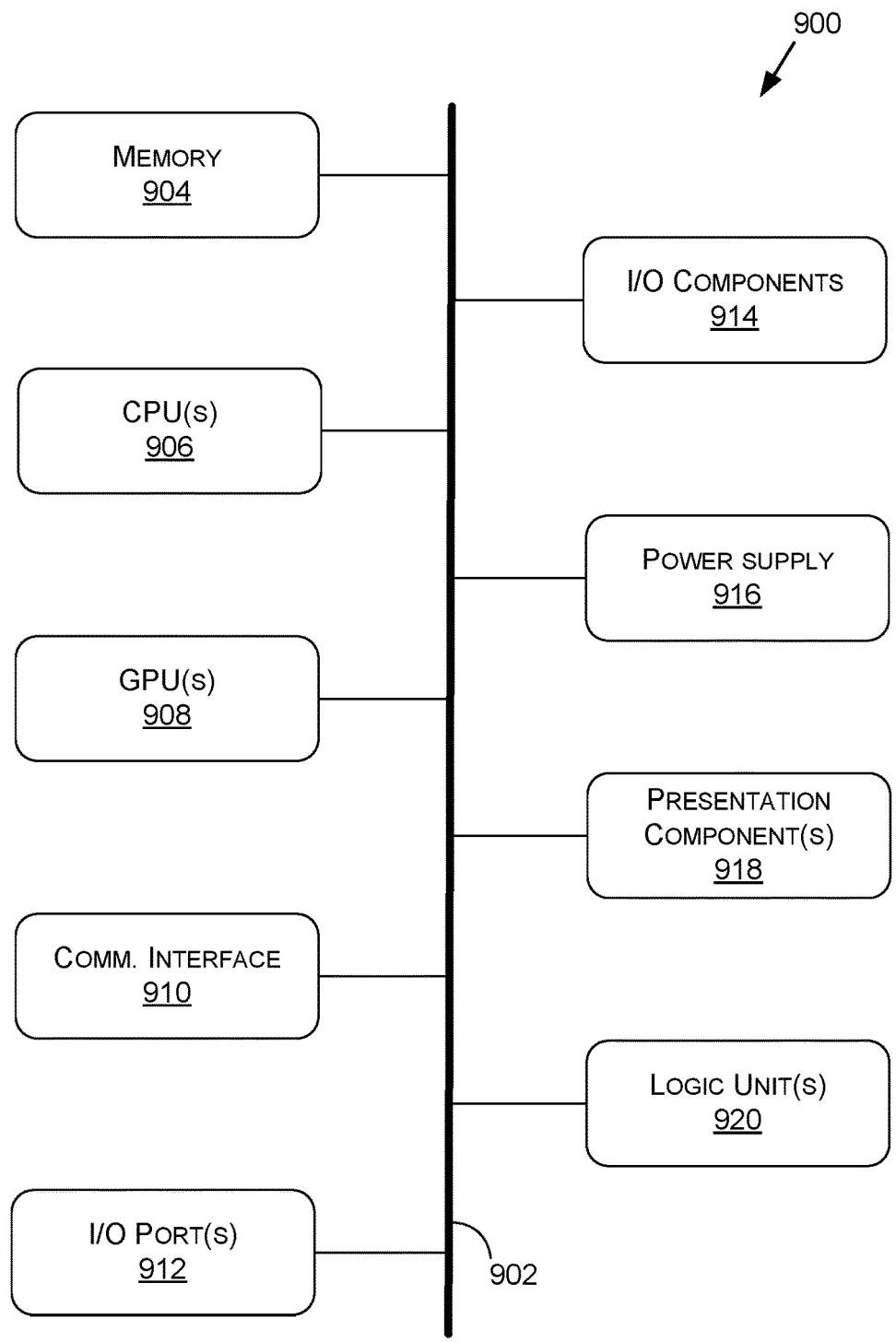
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
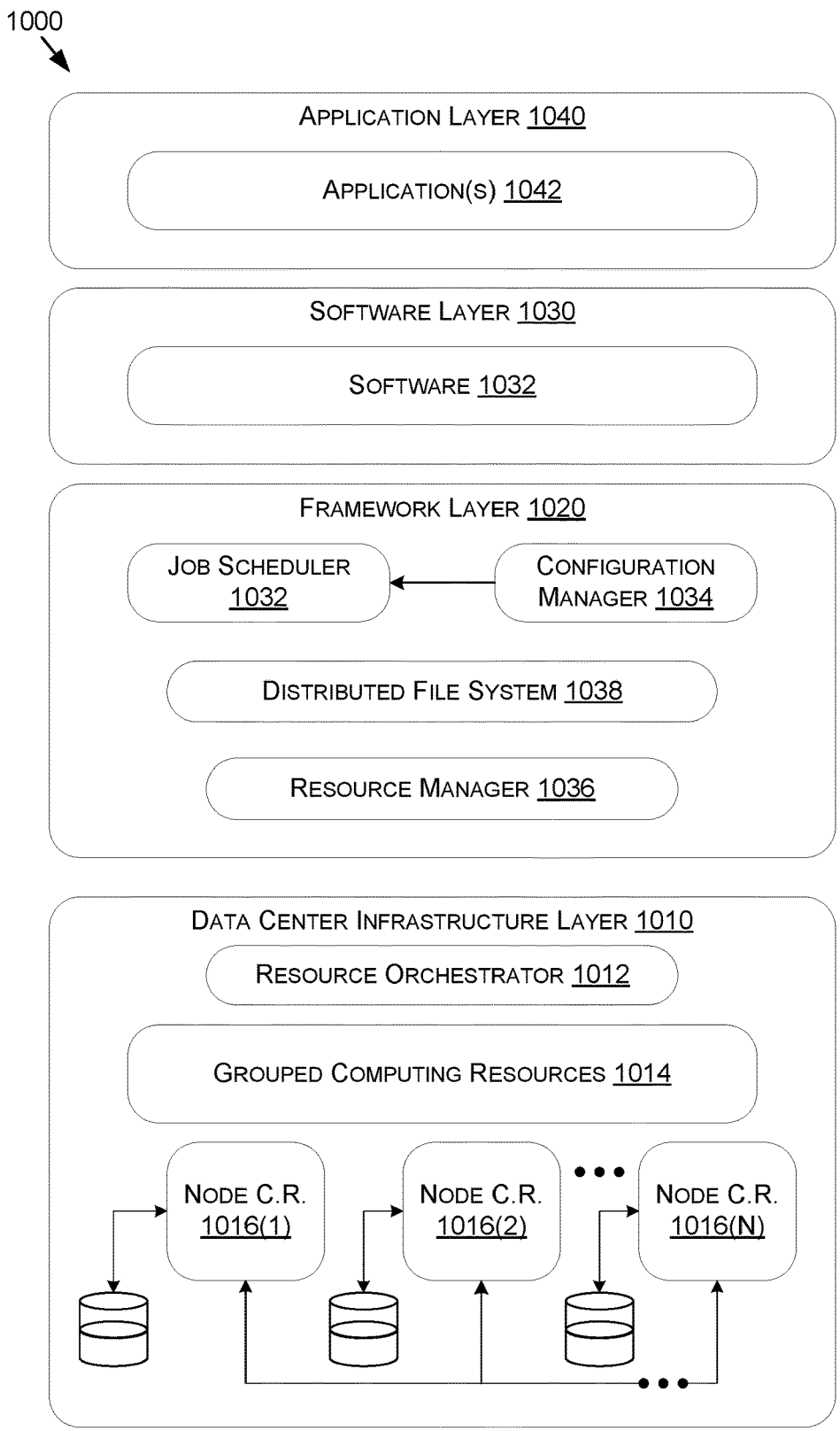
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
computing time scores assigned to corresponding potential future locations of a machine based at least on analyzing geographic information of a geographic area associated with the machine;
based at least on the computing of the time scores, selecting a nominal rail based at least on rating the nominal rail using a first series of the time scores that corresponds to the nominal rail;
based at least on the selecting, generating, using the nominal rail, a plurality of possible trajectories associated with the machine completing an autonomous machine action associated with the nominal rail;
based at least on the generating, rating at least one trajectory of the plurality of possible trajectories based at least on adjusting a second series of the time scores that corresponds to the at least one trajectory to customize the second series of the time scores to the at least one trajectory;
selecting a trajectory for implementation based at least on the rating of the at least one trajectory; and
implementing the trajectory using the machine.

2. The method of claim 1, wherein the selecting of the nominal rail is from a plurality of nominal rails based at least on the rating of the nominal rail relative to a second nominal rail of the plurality of nominal rails.

3. The method of claim 1, wherein the method further includes:
annotating nodes of a lane graph, that represent the corresponding potential future locations, with the time scores;
determining, using the annotated nodes of the lane graph, the first series of the time scores that correspond to the nominal rail; and
determining, using the annotated nodes of the lane graph, a second series of the time scores that correspond to a second nominal rail, wherein the selecting of the nominal rail is based at least on the first series of the time scores and the second series of the time scores.

4. The method of claim 1, wherein the first series of the time scores are along the nominal rail over a first planning horizon, and the rating of the at least one trajectory using the second series of the time scores is over a second planning horizon that is smaller than the first planning horizon.

5. The method of claim 1, wherein the time scores are determined based at least on analyzing a first geographic map, and the adjusting is based at least on analyzing a second geographic map that has a higher level of detail than the first geographic map and covers a smaller geographic area than the first geographic map.

6. The method of claim 1, wherein the at least one trajectory includes the trajectory and the selecting of the trajectory is from the plurality of possible trajectories using, for each given trajectory of the plurality of possible trajectories, a respective series of the time scores adjusted to correspond to the given trajectory.

7. The method of claim 1, wherein the rating includes computing an optimization score for the at least one trajectory, and the adjusting adds time to a time of travel represented by the second series of time scores as a penalty to produce the optimization score.

8. The method of claim 1, wherein the time scores are associated with corresponding graph nodes of a lane graph, and the nominal rail comprises a directed path traversing a subset of the graph nodes.

9. A method comprising:
computing time scores assigned to corresponding potential future locations of a machine;
based at least on the computing of the time scores, selecting a nominal longitudinal rail corresponding to an autonomous machine action for the machine based at least on rating the nominal longitudinal rail using a first series of the time scores that corresponds to the nominal longitudinal rail;
based at least on the selecting, generating a plurality of possible trajectories for the autonomous machine action based at least on laterally varying the nominal longitudinal rail;
based at least on the generating, computing an optimization score for at least one trajectory of the plurality of possible trajectories based at least on adjusting a second series of the time scores that corresponds to the at least one trajectory to customize the optimization score to the at least one trajectory;
determining an individual trajectory using the optimization score; and
implementing the individual trajectory for the machine.

10. The method of claim 9, further comprising generating longitudinal limits for the autonomous machine action using a scene prediction that includes a predicted future object location for an object detected by one or more sensors corresponding to the machine.

11. The method of claim 9, wherein the adjusting includes computing a magnitude of an adjustment to the second series of the time scores based at least on a time to a destination for the machine.

12. The method of claim 9, the selecting includes selecting the autonomous machine action for the machine using a lane graph annotated with the time scores as selection input data.

13. The method of claim 9, further comprising selecting a route between a starting point and a route destination using a geographic data set for a geographic area as input.

14. The method of claim 9, wherein the laterally varying the nominal longitudinal rail includes maintaining curvature of the nominal longitudinal rail in the plurality of possible trajectories.

15. The method of claim 9, wherein each time score of the time scores quantifies an overall value of the machine reaching a corresponding location of the potential future locations.

16. The method of claim 9, wherein the laterally varying the nominal longitudinal rail includes introducing longitudinal variations of the nominal longitudinal rail to the plurality of possible trajectories within longitudinal limits corresponding to the nominal longitudinal rail.

17. A processor comprising:
one or more processing units to determine a trajectory for a machine using time scores assigned to corresponding potential future locations of the machine based at least on selecting a nominal rail, the nominal rail being selected based at least on:
rating the nominal rail using a first series of the time scores that corresponds to the nominal rail,
based at least the selecting, generating at least one trajectory, and
based at least on the generating, rating the at least one trajectory based at least on adjusting a second series of the time scores that corresponds to the at least one trajectory to customize the second series of the time scores to the at least one trajectory.

18. The processor of claim 17, wherein the one or more processing units are further to generate an annotated lane graph comprising the time scores on graph nodes representing positions in one or more lanes, wherein each of the time scores corresponds to a travel time to a route destination.

19. The processor of claim 17, wherein the one or more processing units are further to:
select, using the rating, the trajectory for a starting parameter set used to generate additional trajectories for evaluation; and
evaluate the additional trajectories using the time scores to determine the trajectory for the machine.

20. The processor of claim 17, wherein the adjusting includes adding one or more time penalties to the second series of time scores.

* * * * *